(12) United States Patent
Oka et al.

(10) Patent No.: US 8,164,728 B2
(45) Date of Patent: Apr. 24, 2012

(54) LIQUID CRYSTAL DISPLAY DEVICE

(75) Inventors: Shinichiro Oka, Hitachi (JP); Osamu Itou, Hitachi (JP); Shinichi Komura, Mobara (JP); Hirotaka Imayama, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 128 days.

(21) Appl. No.: 12/843,941

(22) Filed: Jul. 27, 2010

(65) Prior Publication Data

US 2011/0025935 A1    Feb. 3, 2011

(30) Foreign Application Priority Data

Jul. 28, 2009   (JP) ................................ 2009-174981

(51) Int. Cl.
*G02F 1/1343*    (2006.01)
(52) U.S. Cl. ......................................... 349/141; 349/33
(58) Field of Classification Search .................... 349/33, 349/141
See application file for complete search history.

(56) References Cited

U.S. PATENT DOCUMENTS
6,160,601 A    12/2000 Sato

FOREIGN PATENT DOCUMENTS
JP    11-183931    7/1999

OTHER PUBLICATIONS

Taiju Takahashi et al., Novel Measurement Method for Flexoelectric Coefficients of Nematic Liquid Crystals, Japanese Journal of Applied Physics, Apr. 1998, pp. 1865-1869, vol. 37, Part 1, No. 4A.

*Primary Examiner* — Phu Vu
(74) *Attorney, Agent, or Firm* — Antonelli, Terry, Stout & Kraus, LLP.

(57) ABSTRACT

There is provided a liquid crystal display device capable of decreasing the driving voltage of a liquid crystal display panel. The liquid crystal display device includes: a first substrate and a second substrate; a liquid crystal layer interposed between the first substrate and the second substrate; and a pixel electrode and a common electrode arranged between the second substrate and the liquid crystal layer. Either one of the pixel electrode or the common electrode has an interdigital shape. An absolute value of both flexoelectric coefficients $e_{11}$ and $e_{33}$ of the liquid crystal layer is equal to or greater than 5 pC/m.

17 Claims, 15 Drawing Sheets

LIQUID CRYSTAL DISPLAY DEVICE

CROSS-REFERENCE TO RELATED APPLICATION

The present application claims priority from Japanese application JP 2009-174981 filed on Jul. 28, 2009, the content of which is hereby incorporated by reference into this application.

BACKGROUND OF THE INVENTION

1. Field of the Invention

The present invention relates to a liquid crystal display device.

2. Description of the Related Art

Differing from self-emitting display devices as represented by CRT (Cathode Ray Tube) and PDP (Plasma Display Panel), liquid crystal display devices are non-emitting display devices that display videos and images by controlling one or both of transmittance of light from a light source and reflectance of ambient light.

The liquid crystal display devices have advantages in that they are thin and light and consume less power. Thus, in recent years, the liquid crystal display devices are widely used as various displays, for example, such as liquid crystal displays of liquid crystal televisions and personal computers, or liquid crystal displays of mobile electronics such as cellular phones.

The liquid crystal display devices have a liquid crystal display panel and a driver circuit that drives the liquid crystal display panel. The liquid crystal display panel is a display panel in which liquid crystal materials are enclosed between a pair of substrates and includes a display region which is configured by a group of numerous pixels. Each pixel has a pixel electrode, a common electrode, and a liquid crystal layer. Alignment of the liquid crystal layer (liquid crystal molecules) is changed by a potential difference between the pixel electrode and the common electrode, whereby one or both of transmittance and reflectance of light is changed. An arrangement mode of the pixel electrode and common electrode is roughly classified into two modes. One mode arranges the pixel electrode and common electrode on different substrates, whereas the other mode arranges them on the same substrate.

A liquid crystal display panel in which the pixel electrode and common electrode are arranged on the same substrate is generally called an IPS (In-Plane Switching) mode liquid crystal display panel. In such a liquid crystal display panel, liquid crystal molecules rotate in an in-plane direction, so that an effective optical axis is rotated within a plane, whereby one or both of transmittance and reflectance of light is controlled. In a liquid crystal display device having the IPS-mode liquid crystal display panel, since the alignment direction of the liquid crystal layer is approximately horizontal, the liquid crystal layer exhibits a small change in retardation with a change in viewing angle. Therefore, it is known that the IPS-mode liquid crystal display device can achieve a wide viewing angle.

An arrangement mode of the pixel electrode and common electrode in the IPS-mode liquid crystal display panel is roughly classified into two modes. One mode arranges the pixel electrode and common electrode on the same surface of an insulating layer so as to face each other, whereas the other mode arranges the pixel electrode and common electrode so that they are stacked onto each other with an insulating layer disposed therebetween. In the mode where the pixel electrode and common electrode are arranged on the same surface of the insulating layer, the pixel electrode and common electrode are formed into an interdigital shape in planar view, and, for example, are arranged in such a way that fingers of the pixel electrode and fingers of the common electrode are alternately arranged. In the mode where the pixel electrode and common electrode are stacked onto each other, electrodes disposed closer to the liquid crystal layer are formed into an interdigital shape in planar view, whereas the other electrodes are formed into a flat plate-like shape in planar view, for example.

As to the specific configuration of pixels of the IPS-mode liquid crystal display panel, various configurations are known. Moreover, as to the driving method of the IPS-mode liquid crystal display device, various methods are known. Therefore, in this specification, illustrations of related art documents relating to the specific configuration and driving method of the known IPS-mode liquid crystal display device will be omitted.

SUMMARY OF THE INVENTION

An object of the present invention is to provide a liquid crystal display device capable of decreasing the driving voltage of a liquid crystal display panel.

These and other objects and novel features of the present invention will become apparent from the description of this specification and the accompanying drawings.

This application discloses various inventions, and representative inventions among them can be summarized as follows.

(1) A liquid crystal display device includes: a first substrate; a second substrate; a liquid crystal layer interposed between the first substrate and the second substrate; and a pixel electrode and a common electrode arranged between the second substrate and the liquid crystal layer, in which either one of the pixel electrode or the common electrode has an interdigital shape, and an absolute value of both flexoelectric coefficients $e_{11}$ and $e_{33}$ of the liquid crystal layer is equal to or greater than 5 pC/m.

(2) A liquid crystal display device includes: a first substrate; a second substrate; a liquid crystal layer interposed between the first substrate and the second substrate; and a pixel electrode and a common electrode arranged between the second substrate and the liquid crystal layer, in which both the pixel electrode and the common electrode have an interdigital shape, and an absolute value of both flexoelectric coefficients $e_{11}$ and $e_{33}$ of the liquid crystal layer is equal to or greater than 5 pC/m.

DETAILED DESCRIPTION OF THE INVENTION

Figure 1:
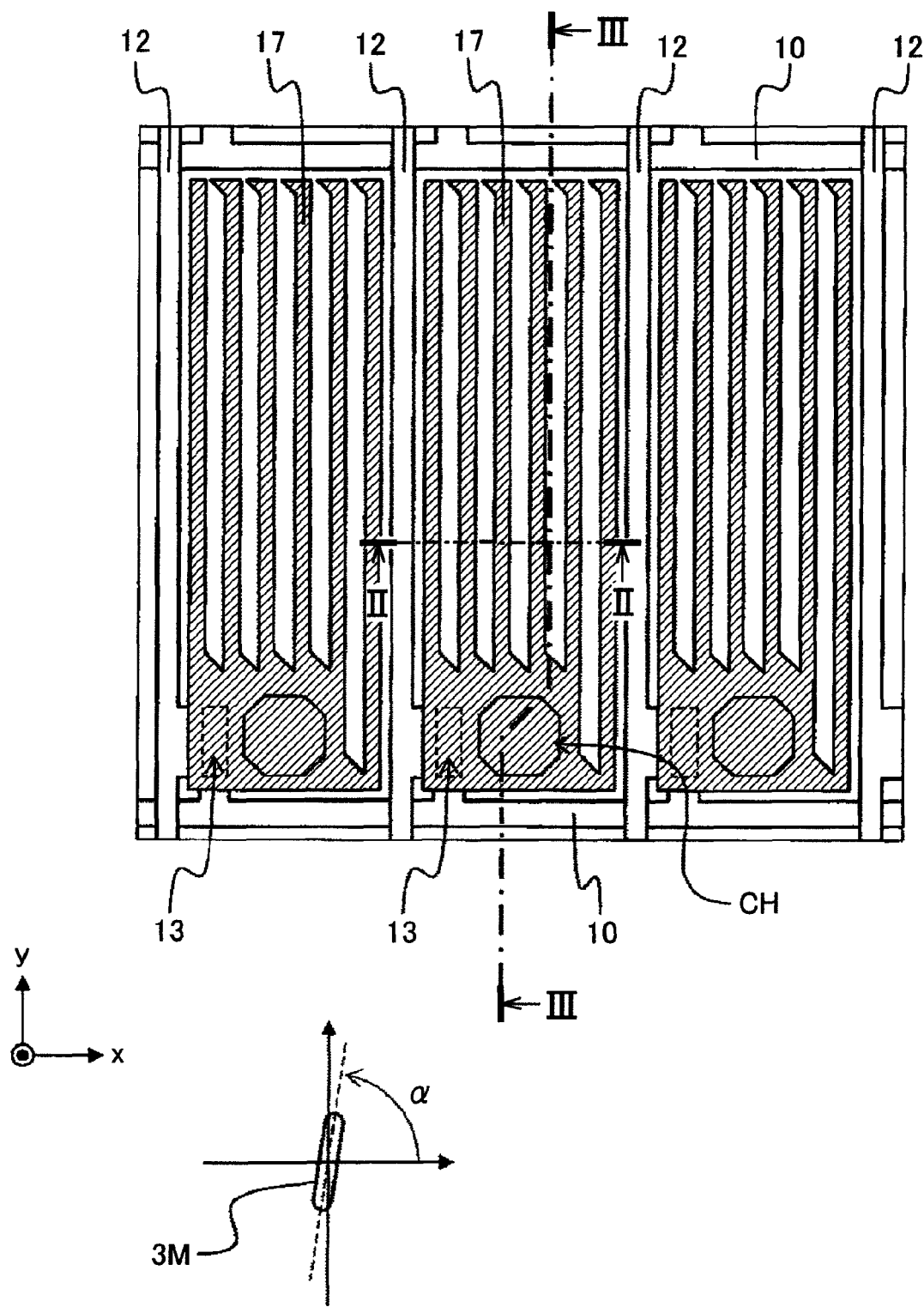
FIG. 1 is a schematic planar view showing an example of a planar configuration of pixels in a liquid crystal display panel according to the present invention and the alignment of liquid crystal molecules.

Hereinafter, the present invention will be described in detail together with implementation forms (embodiments) with reference to the drawings.

Throughout all of the figures illustrating the embodiments, constituent elements having the same functions will be denoted by the same reference numerals, and redundant description thereof will be omitted.

[Embodiment 1]

FIGS. 1 to 5 are schematic views illustrating an example of a schematic configuration of a liquid crystal display panel according to the present invention.

Figure 2:
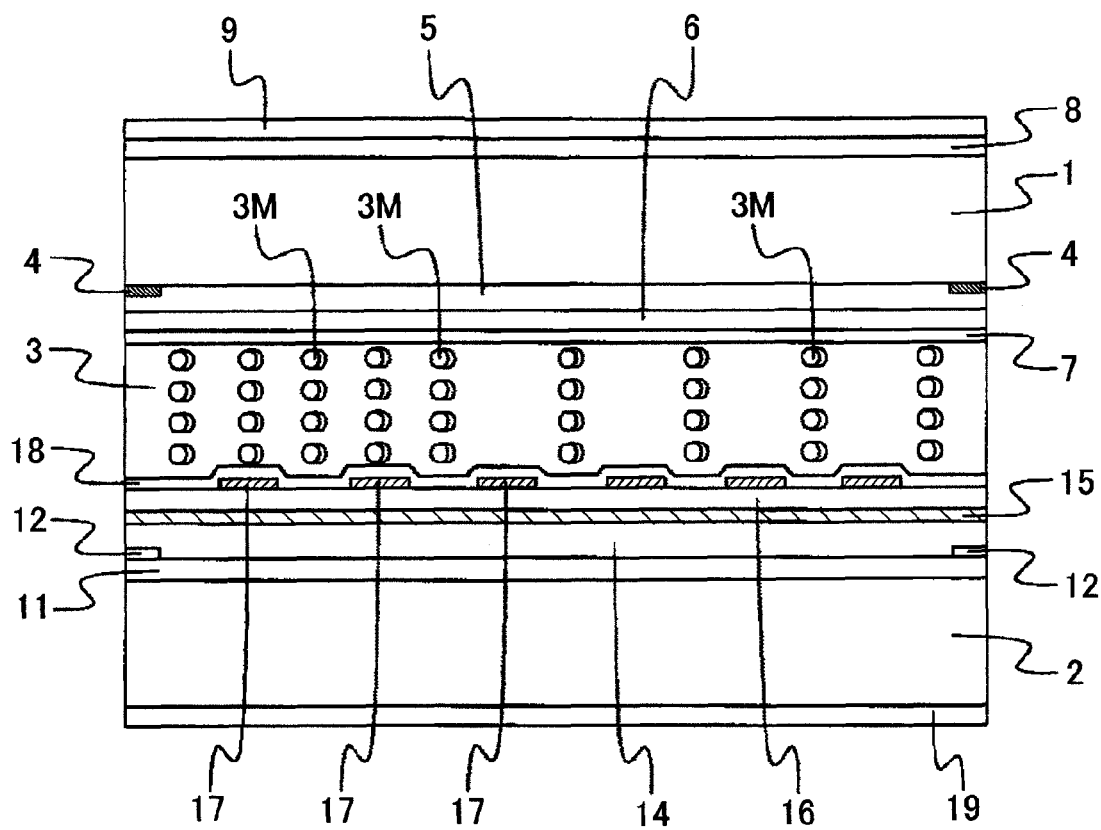
FIG. 2 is a schematic sectional view showing an example of a sectional configuration along the line II-II in FIG. 1.
Figure 2:
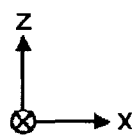
Figure 3:
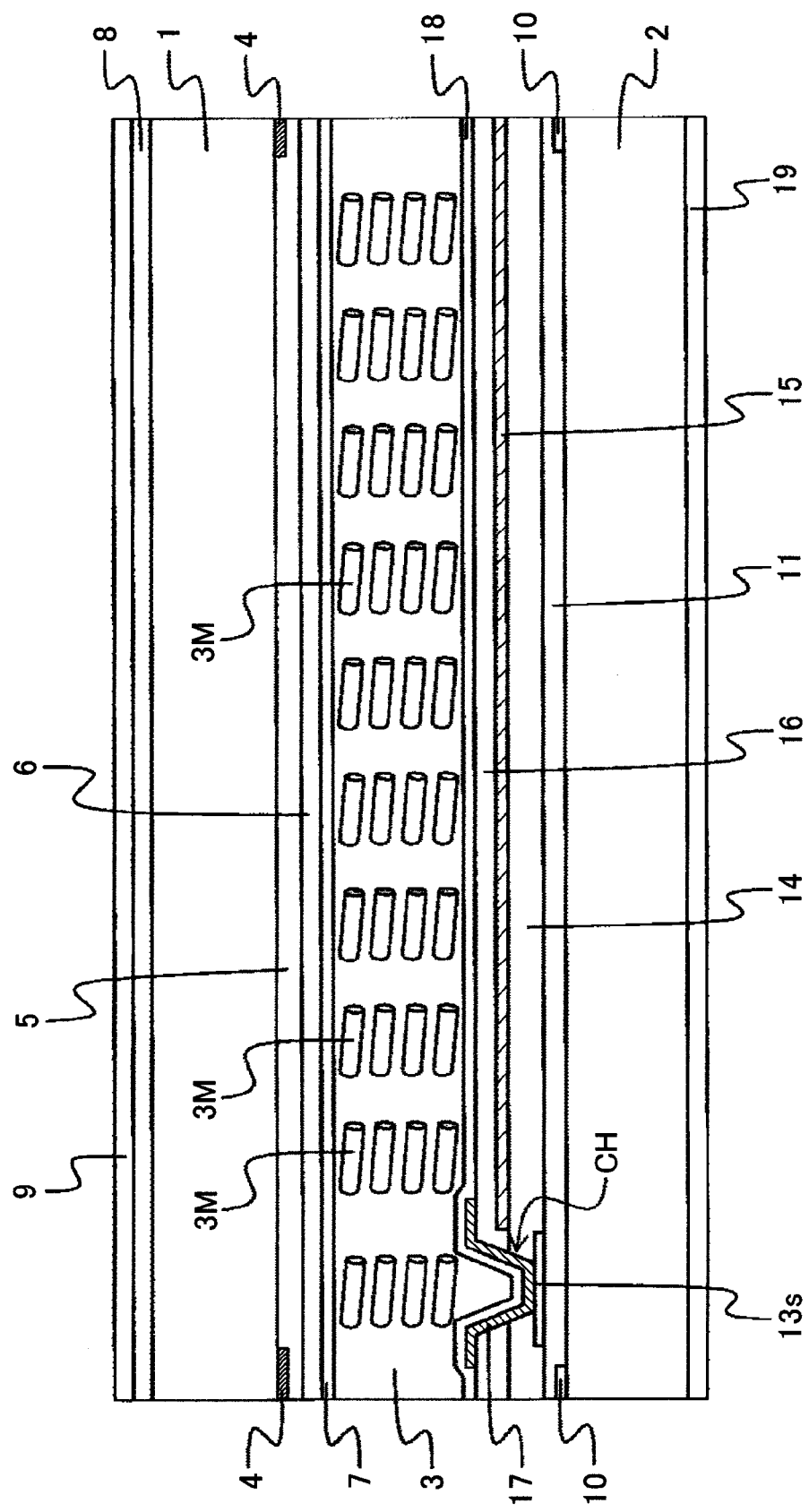
FIG. 3 is a schematic sectional view showing an example of a sectional configuration along the line III-III in FIG. 1.
Figure 4:
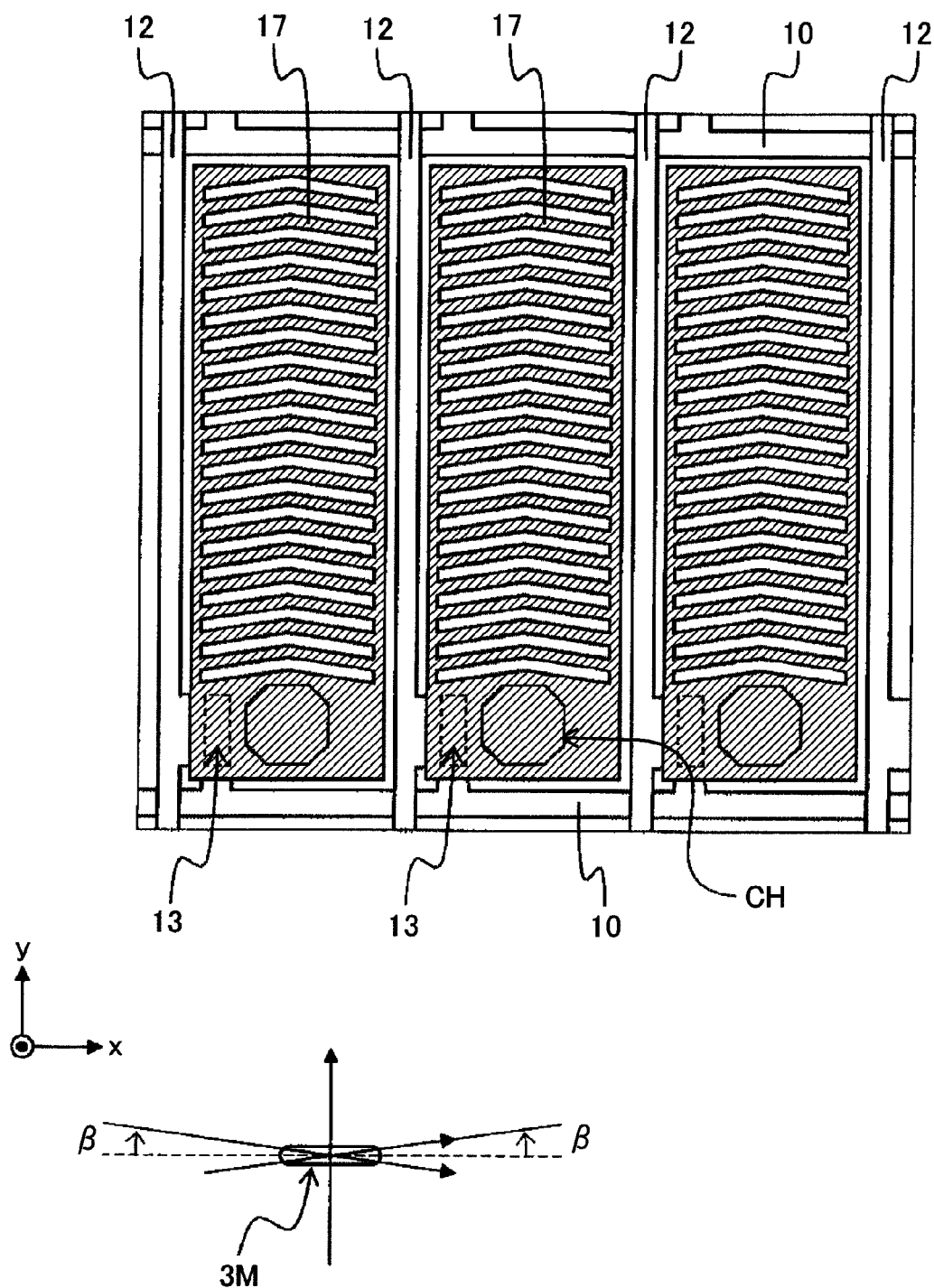
FIG. 4 is a schematic planar view showing a first modification of a planar shape of a pixel electrode and the alignment of liquid crystal molecules.
Figure 5:
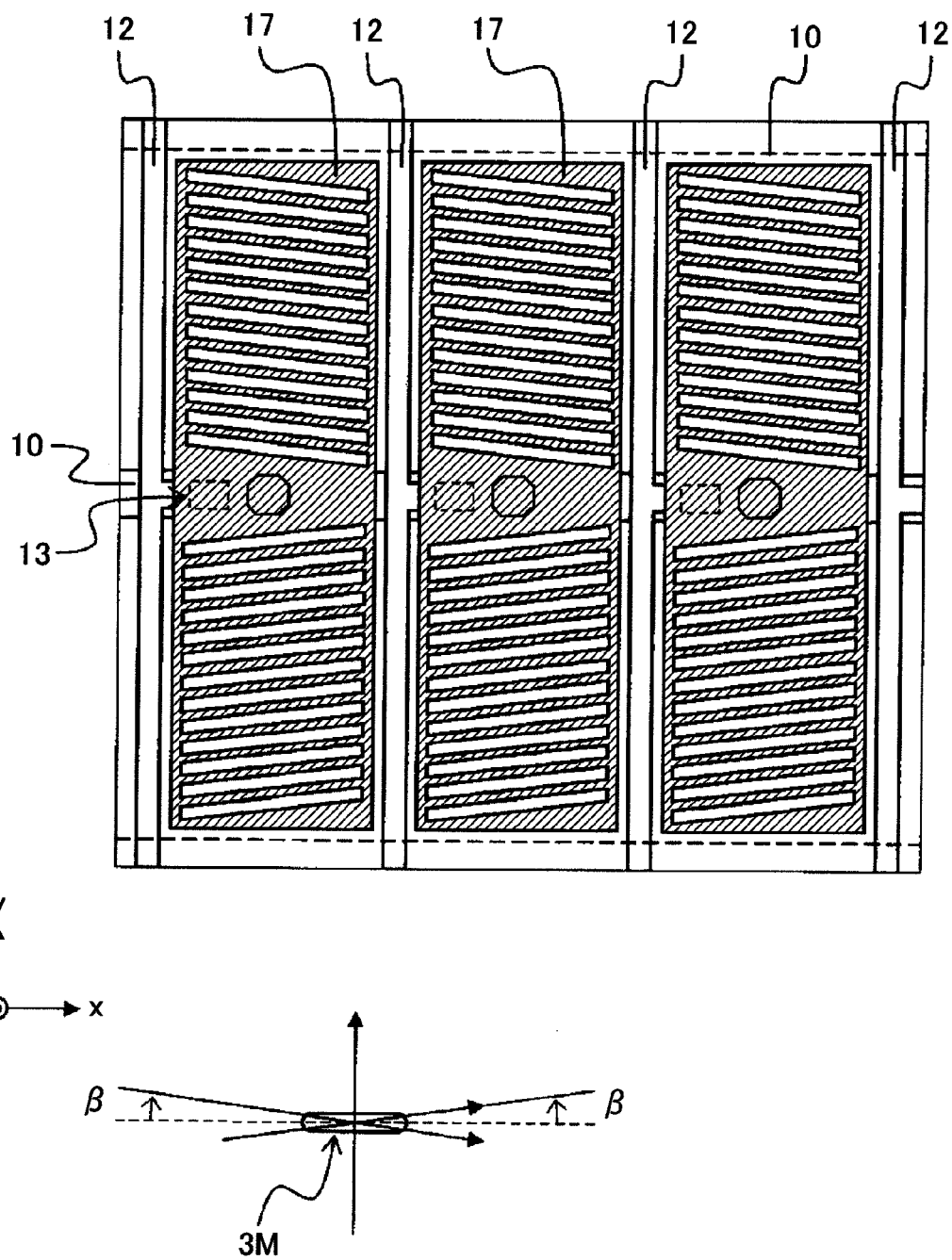
FIG. 5 is a schematic planar view showing a second modification of a planar shape of a pixel electrode and the alignment of liquid crystal molecules.

Specifically, FIG. 1 is a schematic planar view showing an example of a planar configuration of pixels in a liquid crystal display panel according to the present invention and the alignment of liquid crystal molecules; FIG. 2 is a schematic sectional view showing an example of a sectional configuration along the line II-II in FIG. 1; FIG. 3 is a schematic sectional view showing an example of a sectional configuration along the line in FIG. 1; FIG. 4 is a schematic planar view showing a first modification of a planar shape of a pixel electrode; and FIG. 5 is a schematic planar view showing a second modification of a planar shape of a pixel electrode.

In Embodiment 1, an IPS-Pro (IPS-Provectus) mode liquid crystal display device will be described as an example of a liquid crystal display device according to the present invention. In addition, in Embodiment 1, a transmissive liquid crystal display device that has a backlight unit (illumination device) in addition to a liquid crystal display panel and a driver circuit will be described as an example of the liquid crystal display device. As to the configuration of such a liquid crystal display device, various configurations have been proposed. Therefore, in Embodiment 1, description for the entire configuration of such a liquid crystal display device will be omitted, and instead, only the configuration of the liquid crystal display panel which is related to the present invention will be described.

A liquid crystal display panel has a pair of substrates which is made up of a first substrate and a second substrate and a liquid crystal layer which is interposed between the first substrate and the second substrate. In addition, the liquid crystal display panel has a display region which is configured by a number of pixels. Each pixel has a TFT (Thin Film Transistor) element, a pixel electrode, a common electrode, and a liquid crystal layer, for example. In the case of the IPS-Pro mode liquid crystal display panel, each pixel has a configuration, for example, as shown in FIGS. 1 to 3.

A first substrate 1 and a second substrate 2 each are made of a borosilicate glass which has excellent transparency and flatness and contains few ionic impurities.

On a surface of the first substrate 1 facing a liquid crystal layer 3 and the second substrate 2, a black matrix 4, a color filter 5, a planarization film 6, a first alignment film 7, and the like are formed. In addition, on a surface of the first substrate 1 opposite to the surface facing the liquid crystal layer 3, a rear-surface electrode 8 for preventing electrostatic charging is formed. A first polarization plate 9 is attached to an upper surface of the rear-surface electrode 8. The liquid crystal display panel according to the present invention may not be provided with the rear-surface electrode 8.

On the other hand, on a surface of the second substrate 2 facing the liquid crystal layer 3 and the first substrate 1, a scan line 10, a first insulating layer 11, a signal line 12, a semiconductor layer of the TFT element 13, a source electrode 13s of the TFT element 13, a second insulating layer 14, a common electrode 15, a third insulating layer 16, a pixel electrode 17, a second alignment film 18, and the like are formed. In addition, on a surface of the second substrate 2 opposite to the surface facing the liquid crystal layer 3, a second polarization plate 19 is attached.

Between the common electrode 15 and the pixel electrode 17, the pixel electrode 17 is disposed closer to the liquid crystal layer 3 than the common electrode 15. The pixel electrode 17 has an interdigital shape in planar view and is connected to the source electrode 13s through a contact-hole CH. In the example of the planar configuration shown in FIG. 1, one pixel electrode 17 has six elongated portions (hereinafter referred to as fingers) that extend in the y direction and has an interdigital shape that the six fingers are arranged in a line along the x direction. In addition, the common electrode 15 disposed at a distance from the liquid crystal layer 3 is an electrode shared by a plurality of pixels and has a flat plate-like shape or a strip-like shape in planar view.

The liquid crystal layer 3 is, for example, made of a liquid crystal material having positive dielectric anisotropy and is in a homogeneous alignment state when the potential difference between the pixel electrode 17 and the common electrode 15 is 0. Although Embodiment 1 describes only the configuration and operational effects when the liquid crystal material having positive dielectric anisotropy is used, the same effects can be obtained with a liquid crystal material having negative dielectric anisotropy.

When the longitudinal direction of the fingers of the pixel electrode 17 is approximately parallel to the extending direction (the y direction) of the signal line 12 as shown in FIG. 1, the alignment direction of liquid crystal molecules 3M as viewed from the substrate plane is, for example, at an angle α of about 82.5° with respect to the extending direction (the x direction) of the scan line 10. In addition, the liquid crystal molecules 3M are aligned, for example, in a state of being tilted at several degrees with respect to the substrate plane as shown in FIG. 3. In this case, the alignment direction of the liquid crystal molecules 3M is controlled by an alignment treatment (rubbing treatment) performed on the first alignment film 7 and the second alignment film 18.

A manufacturing method of the liquid crystal display panel that has pixels with the configuration as shown in FIGS. 1 to 3 may use any manufacturing method of a known IPS-Pro mode liquid crystal display panel that has pixels with the same configuration. Therefore, in this specification, description of the liquid crystal display panel manufacturing method will be omitted.

The pixel configuration shown in FIGS. 1 to 3 is an example of the configuration corresponding to the IPS-Pro mode. For example, the planar shapes of the TFT element 13 and the pixel electrode 17 may be changed appropriately. In this case, the planar shape of the pixel electrode 17 is not limited to the interdigital shape that a plurality of fingers is arranged in a line along the x direction as shown in FIG. 1, and for example, the pixel electrode 17 may have an interdigital shape that a plurality of fingers is arranged in a line along the y direction as shown in FIG. 4 or FIG. 5.

The pixel electrode 17 shown in FIG. 4 is provided with a plurality of fingers by forming a plurality of slits having an approximately V shape in the inner portion of a flat plate-like electrode. In this case, one pixel electrode 17 has a first region in which the extending direction of the fingers (slits) is tilted counter-clockwise by an angle of β with respect to the x direction and a second region in which the extending direction is tilted clockwise by an angle of β with respect to the x direction. The two regions are arranged in a line along the x direction.

On the other hand, the pixel electrode 17 shown in FIG. 5 has a first region in which a plurality of fingers extending in a first direction is provided and a second region in which a plurality of fingers extending in a second direction is provided. The two regions are provided in the inner portion of the flat plate-like electrode and arranged in a line along the y direction.

When the pixel electrode 17 having the planar shape as shown in FIG. 4 and FIG. 5 is provided, the alignment direction of the liquid crystal molecules 3M during non-application of the electric field is approximately parallel to the extending direction (the x direction) of the scan line 10, for example. By doing so, during application of the electric field, the liquid crystal molecules in the first region and the liquid crystal molecules in the second region rotate in opposite directions. That is, when the liquid crystal molecules in one region rotate clockwise, the liquid crystal molecules in the other region rotate counter-clockwise. In this case, although a region that is colored yellow and a region that is colored watery blue appear in one pixel when viewed from a certain viewing angle direction, since both regions are seen in an overlapping state, the coloring in the viewing angle direction is reduced. Therefore, the liquid crystal display device having such a pixel electrode 17 is able to provide a clearer display and a wider color reproduction range in the viewing angle direction.

Meanwhile, the driving voltage of the liquid crystal display panel is mainly determined by the dielectric anisotropy, elastic constant, viscosity coefficient, and anchoring energy at the interfaces of the liquid crystal layer 3. Among them, the value of the dielectric anisotropy is particularly important. In order to decrease the driving voltage of the liquid crystal display panel, it is necessary to increase the dielectric anisotropy of the liquid crystal layer 3. However, the magnitude of dielectric anisotropy of the liquid crystal layer 3 has an effect on the temperature range, viscosity coefficient, refractive anisotropy, and the like which represent the function (behavior) as the liquid crystal layer. Therefore, the dielectric anisotropy of the liquid crystal layer 3 cannot be increased simply.

In view of the above, the inventors of this application have investigated a method of decreasing the driving voltage of a liquid crystal display panel, and as a result of the investigation, found that the alignment of the liquid crystal layer 3 during application of the electric field to the IPS-Pro mode liquid crystal display device is also affected by flexoelectric polarization. Moreover, as a result of a further investigation, the inventors of this application have also found that the driving voltage can be decreased to be lower than in the known display device by optimizing the flexoelectric coefficient that determines the flexoelectric polarization of the liquid crystal layer 3.

Figure 6A:
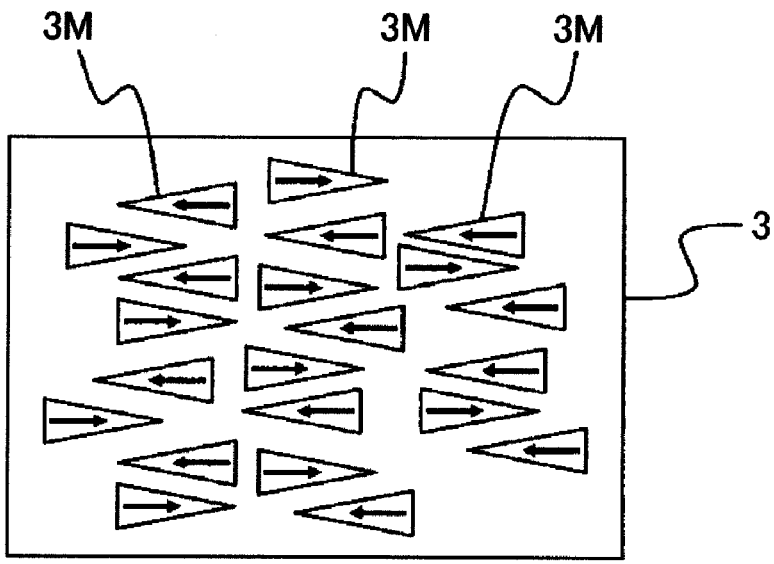
FIGS. 6A and 6B are schematic views showing examples of the relationship between the alignment of a liquid crystal layer and flexoelectric polarization.
Figure 6B:
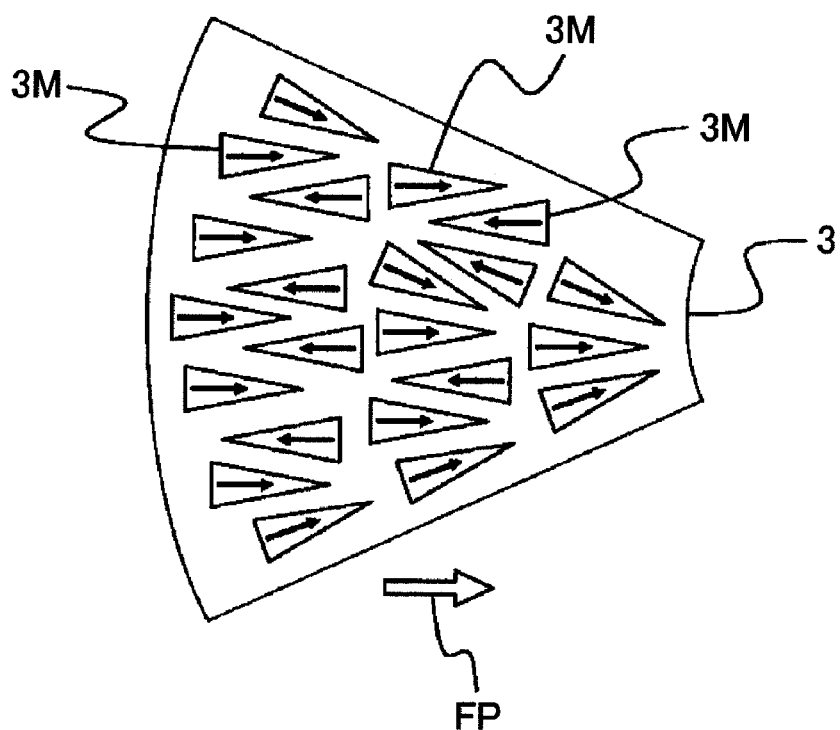
Figure 7:
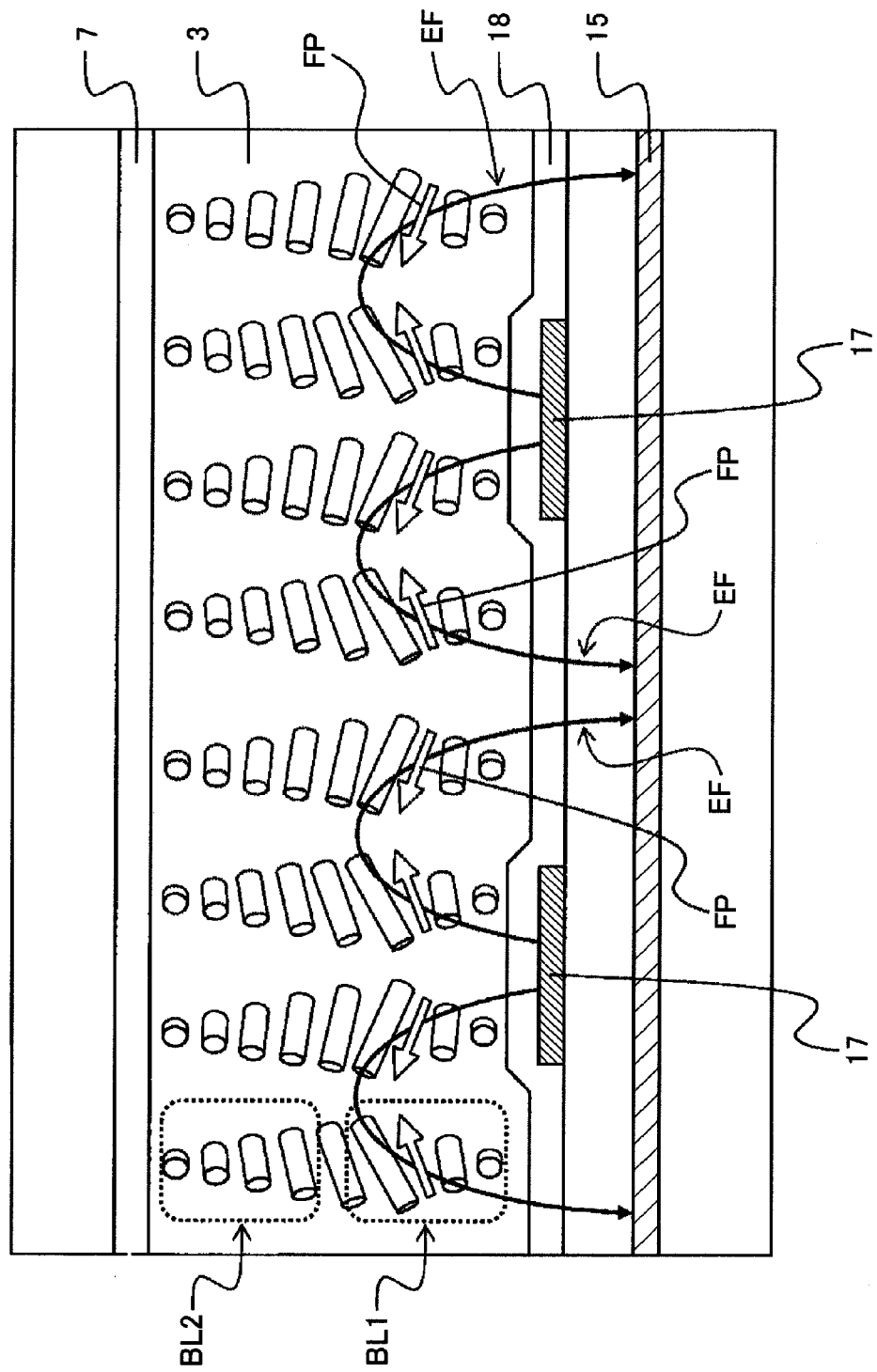
FIG. 7 is a schematic sectional view showing an example of the relationship between an electric field and flexoelectric polarization occurring in a liquid crystal display panel.
Figure 8A:
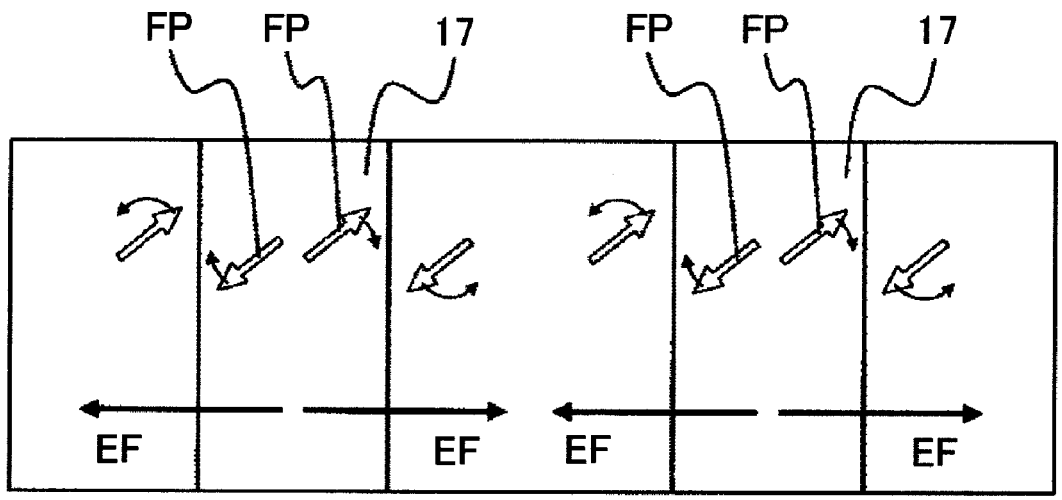
FIGS. 8A and 8B are schematic planar views showing examples of the relationship between the alignment of liquid crystal molecules and flexoelectric polarization.
Figure 8B:
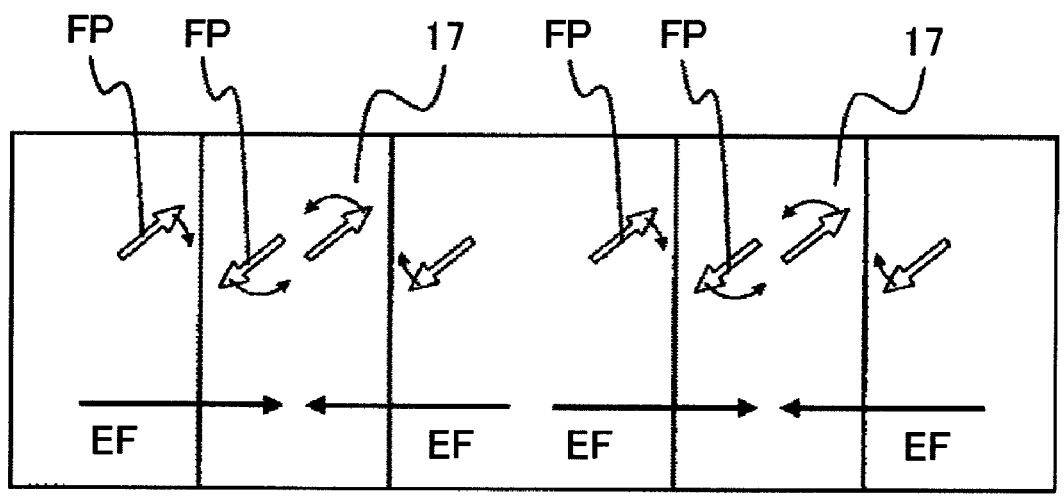

FIGS. 6A and 6B, FIG. 7, and FIGS. 8A and 8B are schematic views illustrating a change in the alignment of the liquid crystal layer in accordance with flexoelectric polarization occurring in the IPS-Pro mode liquid crystal display device. Specifically, FIGS. 6A and 6B are schematic views showing examples of the relationship between alignment of a liquid crystal layer and flexoelectric polarization; FIG. 7 is a schematic sectional view showing an example of the relationship between the electric field and flexoelectric polarization occurring in a liquid crystal display panel; and FIGS. 8A and 8B are schematic planar views showing examples of the relationship between the alignment of a liquid crystal layer and flexoelectric polarization.

The liquid crystal molecules 3M have certain polarity in accordance with a difference in the electro-negativity of constituent atoms. Therefore, the liquid crystal layer 3 which is a collection of the liquid crystal molecules 3M becomes more stable in terms of energy when it is aligned so that the polarizations of the respective liquid crystal molecules 3M are cancelled. Moreover, in the nematic phase, since the heads and tails of the liquid crystal molecules 3M in relation to the alignment direction are not distinguishable, no polarization occurs in the whole liquid crystal layer 3. However, when an abrupt change occurs in the alignment, the polarizations of the respective liquid crystal molecules 3M may appear without being cancelled. The polarization resulting from such a change in the alignment is called flexoelectric polarization, details of which are described, for example, in "The Physics of Liquid Crystals," Chandrasekhar, Yoshioka Press, Sep. 25, 1995, p. 235.

For example, the flexoelectric polarization can occur in a case where the liquid crystal molecules 3M have a wedge-like shape, and when the distal end of the wedge shape is a tail, and the other end thereof is a head, the polarization direction corresponds to either one of the tail and head. In the liquid crystal layer 3 which is a collection of the liquid crystal molecules 3M having such a wedge-like shape, when no alignment deformation occurs, for example, molecules whose polarization directions are rightward and molecules whose polarization directions are leftward will be present in approximately the same proportion as shown in FIG. 6A. Therefore, the polarizations of the individual liquid crystal molecules 3M will be cancelled, and no macroscopic polarization will appear.

On the contrary, when an alignment deformation occurs, the proportions of the heads and tails that follow the alignment direction are different due to the asymmetry and an excluded volume effect of the individual liquid crystal molecules 3M. That is, for example, when an abrupt splay deformation occurs in the liquid crystal layer 3 in such a way that it widens from the right towards the left like a fan shape as shown in FIG. 6B, the proportion of the molecules whose polarization directions are rightward becomes greater than the proportion of the molecules whose polarization directions are leftward. As a result, the polarizations of the individual liquid crystal molecules 3M appear without being cancelled, and a macroscopic polarization (flexoelectric polarization FP) appears in the portion where the splay deformation occurs.

In the IPS-Pro mode liquid crystal display device, when a potential difference occurs between the pixel electrode 17 and the common electrode 15, an arch-shaped line of electric force EF that passes the liquid crystal layer 3 is generated, for example, as shown in FIG. 7. In this case, if the liquid crystal layer 3 has positive dielectric anisotropy, the alignment direction of the liquid crystal molecules in the portions where the line of electric force EF is generated rotates within the substrate plane and change so as to follow the direction of the line of electric force EF.

In addition, in this case, at the interface of the liquid crystal layer 3 with the second alignment film 18, a force that fixes the alignment direction of the liquid crystal molecules to the alignment treatment direction is exerted by the alignment regulating force of the second alignment film 18.

As described above, at the interface of the liquid crystal layer 3 with the second alignment film 18 and the vicinity thereof (a region BL1 in FIG. 7), since two contrary effects compete against each other, an abrupt change in the alignment (splay deformation) occurs in a direction from the interface with the second alignment film 18 towards portions where the electric field is present. In addition, in this case, opposite splay deformations occur between adjacent two fingers of the pixel electrode 17 as shown in FIG. 7. Therefore, in the liquid crystal layer 3, flexoelectric polarizations FP occur in directions as shown by empty arrows in FIG. 7.

As is clear from FIG. 7, in the liquid crystal layer 3, the splay deformation also occurs in a region BL2 which is disposed between the vicinity of the center in the thickness direction thereof and the interface with the first alignment film 7. However, the splay deformation in the region BL2 is gentle compared with that in the region BL1, and the region BL2 is distant from the second substrate 2 (the second alignment film 18) on which the electric field is concentrated than the region BL1. Therefore, the splay deformation in the region BL2 is less important compared with the splay deformation in the region BL1, and thus, in the following description, the splay deformation in the region BL2 will not be taken into consideration.

When the flexoelectric polarization FP occurs in the liquid crystal layer 3, the flexoelectric polarization itself causes a change in the alignment in response to the electric field (the line of electric force EF), and the change in the alignment is added to the alignment deformation caused by dielectric anisotropy. The relationship between the direction of the electric field (the line of electric force EF) and the direction of the flexoelectric polarization FP when the potential of the pixel electrode 17 is higher than the potential of the common electrode 15 can be plotted, for example, as shown in FIG. 8A. In FIG. 8A, the alignment deformation caused by dielectric anisotropy and the alignment deformation caused by flexoelectric polarization FP are illustrated separately so as to clearly show the effect of the latter. For this purpose, the flexoelectric polarizations FP in FIG. 8A correspond to the flexoelectric polarizations in the alignment state when only the alignment deformation caused by dielectric anisotropy is taken into consideration, and the response of the flexoelectric polarization itself to the electric field is not taken into consideration.

When the flexoelectric polarization FP is not taken into consideration, a change in the alignment direction of the liquid crystal layer 3 during application of the electric voltage can be represented by clockwise rotation on the plane shown in FIG. 8A.

On the contrary, the change in the alignment caused by the flexoelectric polarization FP can be represented by rotation that follows a state where the flexoelectric polarizations are approximately parallel to the electric field direction. Therefore, as shown in FIG. 8A, a portion where clockwise rotation occurs and a portion where counter-clockwise rotation occurs appear alternately. In FIG. 8A, counter-clockwise rotation occurs in a spacing portion (on the slit) between two adjacent fingers of the pixel electrode 17. In this case, the alignment of liquid crystal molecules present on the slits of the pixel electrode 17 changes in the direction of returning to the state during non-application of the electric voltage, and thus transmittance changes. At that time, clockwise rotation occurs on the pixel electrode 17, whereby transmittance changes.

When the potential of the pixel electrode 17 is lower than the potential of the common electrode 15, as shown in FIG. 8B, clockwise rotation occurs in the spacing portion (on the slit) of the fingers of the pixel electrode 17, and counter-clockwise rotation occurs on the pixel electrode 17. In this case, by the response of the flexoelectric polarization FP to the electric field, transmittance changes as described above.

That is, it is known that when a liquid crystal display panel is driven by reversing the polarities of pixels every predetermined frame period, namely changing the magnitude relationship between the potential of the pixel electrode 17 and the potential of the common electrode 15, a change in the transmittance is observed in any frame period (or any polarity), and light utilization efficiency is determined by the sum of transmittances in the respective frame periods.

To summarize the foregoing, in the IPS-Pro mode liquid crystal display panel, since an abrupt splay deformation occurs in response to voltage application, for example, when liquid crystal molecules having a wedge-like molecular shape and exhibiting polarization in the direction of their head or tail are contained in the liquid crystal layer 3, the flexoelectric polarization FP occurs. In addition, when the flexoelectric polarization FP occurs, the flexoelectric polarization itself causes a change in the alignment so as to return to the state during non-application of voltage in response to an electric field, and as a result, transmittance changes in accordance with the polarity of the applied voltage.

The inventors of this application have investigated the effect of the flexoelectric polarization FP on the change in transmittance. It is well known that the alignment of the liquid crystal layer 3 can be calculated from Frank elastic free energy as given by Expression (1) below.

$$f_{elas} = \frac{1}{2}[K_{11}(\nabla \cdot n)^2 + K_{22}(n \cdot \nabla \times n)^2 + K_{33}(n \times \nabla \times n)^2] \qquad (1)$$

In Expression 1, n is an alignment vector, $K_{11}$, $K_{22}$, and $K_{33}$ are elastic constants corresponding to splay deformation, twist deformation, and bend deformation, respectively.

When the flexoelectric polarization FP is taken into consideration at the time of calculating the alignment of the liquid crystal layer 3, electric polarization P induced by the flexoelectric polarization FP should be incorporated. Between the electric polarization P and distortion of the alignment vector n, a relationship given by Expression (2) is satisfied.

$$P = e_{11}(\nabla \cdot n)^2 + e_{33}(n \times \nabla \times n)^2 \qquad (2)$$

In Expression (2), $e_{11}$ and $e_{33}$ are flexoelectric coefficients of splay deformation and bend deformation, respectively.

The flexoelectric coefficients are different in accordance with a liquid crystal material, and can be measured using a method disclosed in T. Takahashi, et al. Jpn. J. Appl. Phys. Vol. 37, 1998, p. 1865, for example. Therefore, by incorporating the electric polarization P obtained from Expression (2) into Expression (1), it is possible to calculate the alignment of the liquid crystal layer 3 in which the flexoelectric polarization (flexoelectric effect) is introduced. Moreover, as described in T. Takahashi, et al. Jpn. J. Appl. Phys. Vol. 37, 1998, p. 1865, the flexoelectric coefficients $e_{11}$ and $e_{33}$ are generally measured in the form of the sum or difference of $e_{11}$ and $e_{33}$. Therefore, in the following description, the flexoelectric coefficient is denoted by E ($=e_{11}=e_{33}$). Moreover, since the flexoelectric coefficients $e_{11}$ and $e_{33}$ may have either positive or negative values, in the following description, the flexoelectric coefficient E is represented by its absolute value even when there is no special mark.

Figure 9:
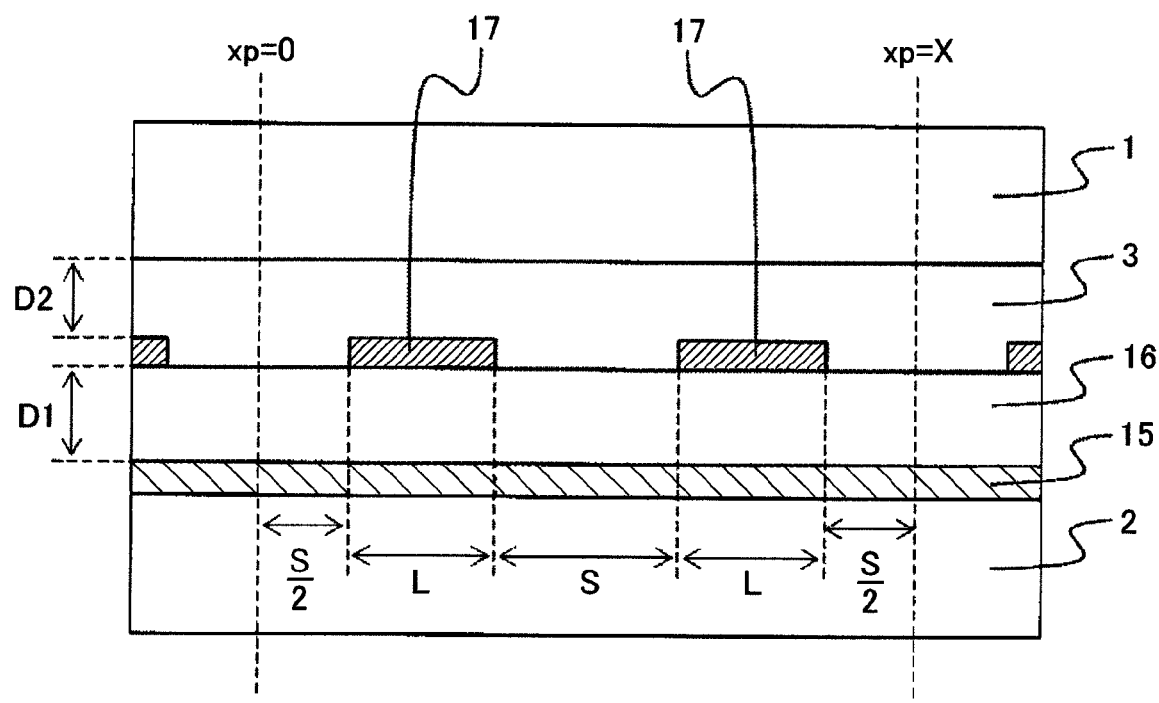
FIG. 9 is a schematic sectional view showing a model used in calculation of the alignment of a liquid crystal layer when flexoelectric polarization has been taken into consideration.

FIG. 9 is a schematic sectional view showing a model used in calculation of the alignment of a liquid crystal layer when flexoelectric polarization has been taken into consideration.

When calculating the alignment of the liquid crystal layer 3 by Expressions (1) and (2), the inventors of this application used a model as shown in FIG. 9 in which the liquid crystal layer 3 is disposed between the first substrate 1 and the second substrate 2 on which the flat plate-like common electrode 15, the third insulating layer 16, and the interdigital pixel electrode 17 are stacked. In this case, the width L (electrode width) of the finger of the pixel electrode 17 was 4 µm, and the spacing S of the fingers was 5 µm. Moreover, the thickness D1 of the third insulating layer 16 was 400 µm, and the thickness D2 of the liquid crystal layer 3 was 3.5 µm. Furthermore, the liquid crystal layer 3 was made from a liquid crystal material whose dielectric anisotropy $\Delta \in$ is 6.5 and retardation $\Delta n \cdot d$ is 380 µm, and a pretilt angle was 2°.

In addition, for calculation of the alignment of the liquid crystal layer 3, an LCD-Master (product of Shintech Inc.), which is one of the simulators capable of 2-dimensional simulation and incorporating therein the electric polarization P given by Expression (2), was used.

Figure 10A:
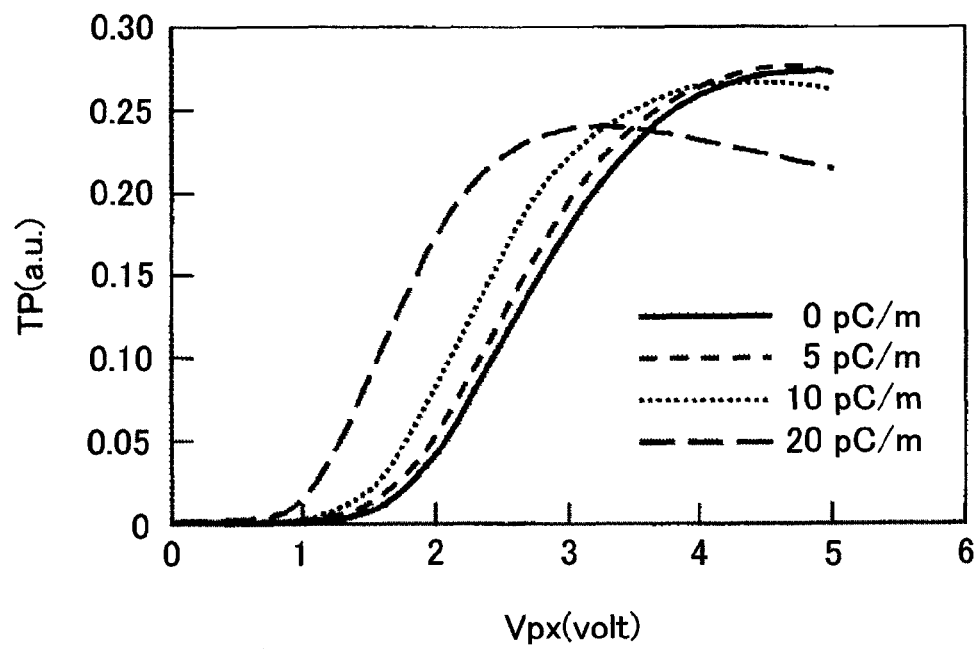
FIGS. 10A and 10B are graphs showing the flexoelectric coefficient dependence of the relationship between the driving voltage and transmittance.
Figure 10B:
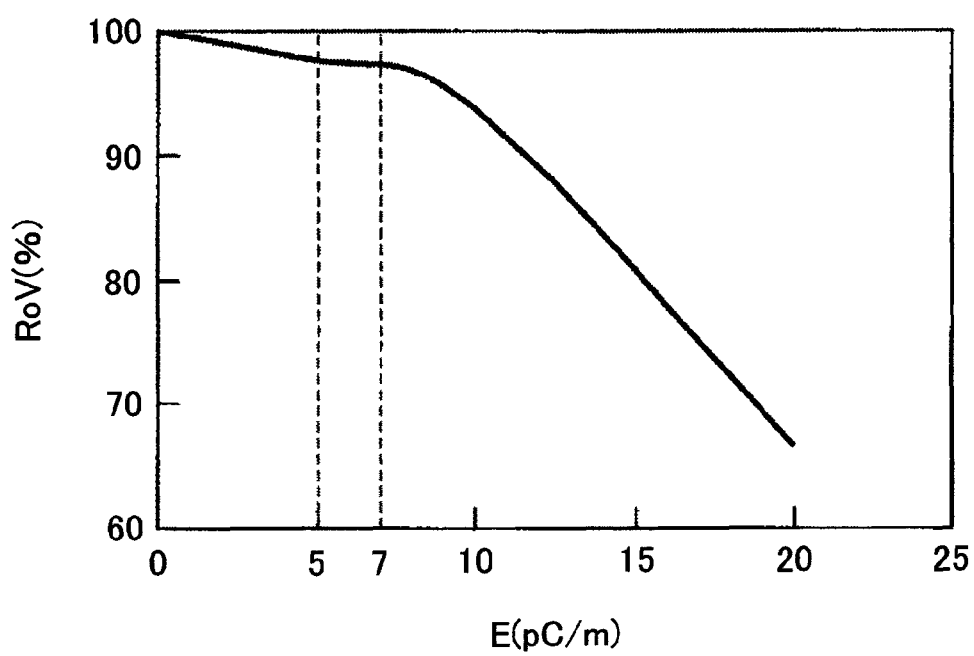

FIGS. 10A and 10B are graphs showing flexoelectric coefficient dependence of the relationship between the driving voltage and transmittance.

In FIG. 10A, the horizontal axis is the amplitude Vpx (in units of volts) of an AC voltage applied to the pixel electrode 17, and the vertical axis is transmittance TP (in an arbitrary unit). The graph of FIG. 10A shows the relationship between the amplitude Vpx of the AC voltage and the transmittance TP when the flexoelectric coefficient E ($=e_{11}=e_{33}$) was 0 pC/m, 5 pC/m, 10 pC/m, and 20 pC/m. In FIG. 10B, the horizontal axis is the flexoelectric coefficient E (in units of pC/m), and the vertical axis is the voltage ratio RoV (in units of %) of the applied AC voltage. Moreover, the voltage ratio RoV in the graph of FIG. 10B is the ratio of the amplitude Vpx, at which the transmittance TP becomes maximum for the respective flexoelectric coefficients, to the amplitude Vpx, at which the transmittance TP becomes maximum when the flexoelectric coefficient was 0 pC/m.

The inventors of this application calculated the transmittance when a predetermined AC voltage was applied to the pixel electrode 17 based on the alignment of the liquid crystal layer 3 obtained through calculation using the simulator and obtained results as shown in FIG. 10A. The results shown in FIG. 10A are the relationship between the magnitude of the amplitude Vpx and the transmittance TP when an AC voltage having a frequency of 30 Hz was applied to the pixel electrode 17 while changing the amplitude Vpx.

It can be understood from FIG. 10A that the amplitude Vpx of the AC voltage at which the transmittance TP becomes maximum decreases as the flexoelectric coefficient E increases. The driving voltage of a liquid crystal display panel is generally set to be between 0 volts and the amplitude Vpx at which the transmittance TP becomes maximum, and is set to a value that is slightly lower than the amplitude Vpx at which the transmittance TP becomes maximum. Therefore, by increasing the flexoelectric coefficient E of the liquid crystal layer 3, it is possible to decrease the driving voltage of the liquid crystal display panel.

In addition, when the relationship between the flexoelectric coefficient E and the amplitude Vpx at which the transmittance TP becomes maximum was investigated based on the results as shown in FIG. 10A, results as shown in FIG. 10B were obtained, for example.

It can be more clearly understood from FIG. 10B that it is possible to decrease the driving voltage of the liquid crystal display panel by increasing the flexoelectric coefficient E. In this case, the relationship between the flexoelectric coefficient E and the voltage ratio RoV has its inflection point at 7 pC/m, and the voltage ratio RoV decreases abruptly as the flexoelectric coefficient E becomes greater than 7 pC/m. That is, by increasing the flexoelectric coefficient E ($=e_{11}=e_{33}$) of the liquid crystal layer 3 to be greater than 7 pC/m, it is possible to decrease the driving voltage of the liquid crystal display panel greatly.

Meanwhile, as understood from T. Takahashi, et al. Jpn. J. Appl. Phys. Vol. 37, 1998, p. 1865, the absolute value of the flexoelectric coefficient E ($=e_{11}=e_{33}$) is generally in the range of about 0 to 3 pC/m. Therefore, it is difficult to obtain this effect in the known liquid crystal display panel using a general liquid crystal material.

It can be understood from FIG. 10B that the relationship between the flexoelectric coefficient E and the voltage ratio RoV has another inflection point at around 5 pC/m, and a change (decrease) in the voltage ratio RoV is small when the flexoelectric coefficient E is in the range of 5 pC/m and 7 pC/m. Moreover, the voltage ratio RoV when the flexoelectric coefficient E is 5 pC/m is about 98%, and there is a noticeable difference between the voltage ratios RoV (from 100% to about 99.5%) when the flexoelectric coefficient E is in the range of 0 and 3 pC/m. Therefore, it can be said that by increasing the absolute value of the flexoelectric coefficient E of the liquid crystal layer 3 to be greater than 5 pC/m, it is possible to decrease the driving voltage of the liquid crystal display panel to be lower than the known liquid crystal display panel.

Furthermore, when the flexoelectric coefficient E of the liquid crystal layer 3 was increased, the voltage ratio RoV (driving voltage) can be decreased, whereas the maximum of the transmittance TP decreases gradually as understood from FIG. 10A. Therefore, it can be said that it may be helpful to set the absolute value of the flexoelectric coefficient E of the liquid crystal layer 3 to be in the range of 5 pC/m and 7 pC/m in order to decrease the driving voltage while suppressing a decrease in the luminance of pixels.

Although detailed results of the analysis are not illustrated, the effects described above have different influences depending on the absolute value of the flexoelectric coefficient E ($=e_{11}=e_{33}$), and the same effects are obtained with negative flexoelectric coefficients E.

As described above, according to the liquid crystal display panel of Embodiment 1, by setting the absolute value of the flexoelectric coefficient of the liquid crystal layer 3 to be equal to or greater than 5 pC/m, it is possible to decrease the driving voltage. In addition, in the liquid crystal display panel of Embodiment 1, by setting the absolute value of the flexoelectric coefficient of the liquid crystal layer 3 to be equal to or greater than 7 pC/m, it is possible to decrease the driving voltage further greatly.

Moreover, in the liquid crystal display panel of Embodiment 1, by setting the absolute value of the flexoelectric coefficient of the liquid crystal layer 3 to be in the range of 5 pC/m and 7 pC/m, it is possible to decrease the driving voltage while suppressing a decrease in illuminance.

Furthermore, in Embodiment 1, the IPS-Pro mode liquid crystal display panel was described as an example of a liquid crystal display panel to which the present invention is applied. The configuration of Embodiment 1 is not limited to this, but can be applied to an AS-IPS (Advanced Super-IPS) mode liquid crystal display panel, for example, in which the pixel electrode 17 and the common electrode 15 are arranged on the same surface of an insulating layer. In the case of the AS-IPS mode liquid crystal display panel, both the pixel electrode 17 and the common electrode 15 have an interdigital shape, and the fingers of the pixel electrode 17 and the fingers of the common electrode 15 are alternately arranged. Therefore, when the AS-IPS mode liquid crystal display panel is driven, an arch-like line of electric force EF as shown in FIG. 7 is generated, and the flexoelectric polarization FP occurs in the liquid crystal layer 3. Therefore, by setting the absolute value of the flexoelectric coefficient of the liquid crystal layer 3 of the AS-IPS mode liquid crystal display panel to be equal to or greater than 5 pC/m, it is possible to decrease the driving voltage while suppressing a decrease in luminance.

[Embodiment 2]

In Embodiment 1, the driving voltage of the liquid crystal display panel is decreased by increasing the absolute value of the flexoelectric coefficient $E$ (=$e_{11}$=$e_{33}$) of the liquid crystal layer 3. However, when the flexoelectric coefficient E of the liquid crystal layer 3 is increased, the flexoelectric polarization FP will increase. According to JP 11-183931 A, it is described that in the IPS-mode liquid crystal display device, the flexoelectric polarization may cause latent images. Therefore, when the absolute value of the flexoelectric coefficient E of the liquid crystal layer 3 is increased as in the case of the liquid crystal display device of Embodiment 1, there is a possibility that flickers and latent images are generated.

Figure 11:
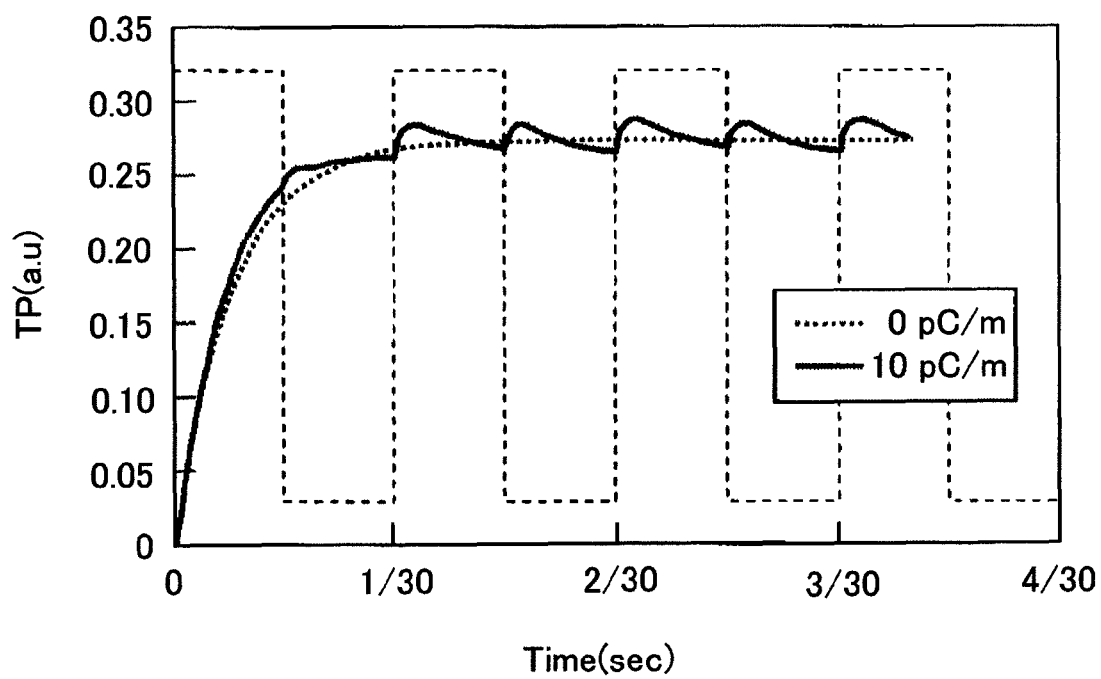
FIG. 11 is a graph showing an example of a change over time in transmittance in a liquid crystal display device of Embodiment 1.

FIG. 11 is a graph showing an example of a change over time in transmittance in a liquid crystal display device of Embodiment 1. In FIG. 11, the horizontal axis is the elapsed time (in units of seconds) from the driving start time, and the vertical axis is the transmittance TP (in an arbitrary unit).

As the main cause of flickers observed in the liquid crystal display device of Embodiment 1, the following can be considered. The inventors of this application calculated a change over time in the transmittance TP when a predetermined AC voltage was applied to the pixel electrode 17 based on the alignment of the liquid crystal layer 3 obtained through calculation using the simulator (LCD-Master) mentioned in Embodiment 1 and obtained results as shown in FIG. 11. In FIG. 11, the solid line is the change over time in the transmittance TP when the flexoelectric coefficient $E$ (=$e_{11}$=$e_{33}$) was set to 10 pC/m, and the dotted line is the change over time in the transmittance TP when the flexoelectric coefficient E was set to 0 pC/m. Moreover, in FIG. 11, the rectangular waveform in the broken line is an AC voltage applied to the pixel electrode 17, and a ±5 volt AC voltage was applied at a frequency of 30 Hz. That is, the change over time in the transmittance TP shown in FIG. 11 corresponds to a change over time in a liquid crystal display device in which the driving frequency is 60 Hz, and the polarities (the magnitude relationship between the potential of the pixel electrode 17 and the common electrode 15) are reversed every frame period.

As understood from FIG. 11, when the transmittance TP was calculated without the flexoelectric polarization being taken into consideration, no change in the transmittance TP corresponding to a change in the polarity of the voltage applied to the pixel electrode 17 was observed. On the contrary, when the transmittance TP was calculated with the flexoelectric polarization being taken into consideration, a change in the transmittance TP corresponding to a change in the polarity of the voltage applied to the pixel electrode 17 was observed. That is to say, when there is flexoelectric polarization, the transmittance TP changes over time, and this change over time is observed as flickers.

In addition, the transmittance TP can be calculated as an average within one frame period, and the flicker intensity can be calculated by obtaining its ratio between positive and negative-polarity application periods.

Figure 12:
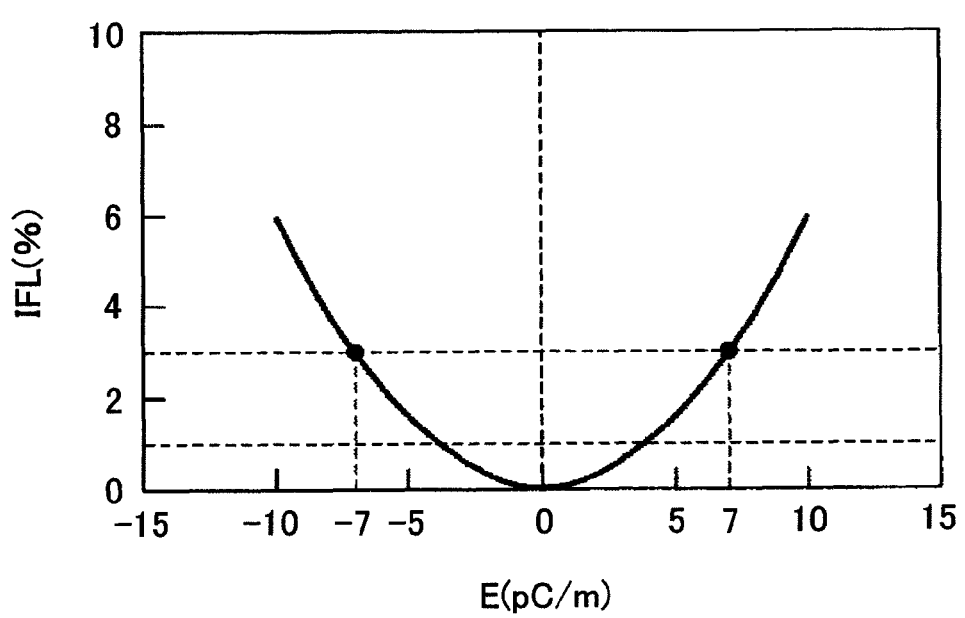
FIG. 12 is a graph showing an example of the relationship between the flexoelectric coefficient and flicker intensity.

FIG. 12 is a graph showing an example of the relationship between the flexoelectric coefficient and flicker intensity. In FIG. 12, the horizontal axis is the flexoelectric coefficient E (in units of pC/m) the vertical axis is the flicker intensity IFL (in units of %).

The inventors of this application simulated the relationship between the flexoelectric coefficient E and the flicker intensity IFL when the pixels of the model shown in FIG. 9 were driven with a ±5 volt AC voltage and obtained results as shown in FIG. 12. The flicker intensity IFL of the liquid crystal display device is allowable if it is within 3%, and preferably, is within 1%. Therefore, as understood from FIG. 12, it is necessary to set the absolute value of the flexoelectric coefficient $E$ (=$e_{11}$=$e_{33}$) of the liquid crystal layer 3 to be equal to or smaller than 7 pC/m in order to decrease the flicker intensity IFL so as to fall within the allowable range. In addition, it is necessary to set the absolute value of the flexoelectric coefficient of the liquid crystal layer 3 to be equal to or smaller than 5 pC/m in order to decrease the flicker intensity IFL so as to fall within 1%.

On the contrary, in the liquid crystal display device of Embodiment 1, the driving voltage was decreased by setting the absolute value of the flexoelectric coefficient to be equal to or greater than 5 pC/m. That is, in the liquid crystal display device of Embodiment 1, when the absolute value of the flexoelectric coefficient of the liquid crystal layer 3 was set to be equal to or greater than 5 pC/m and equal to or smaller than 7 pC/m, although it is possible to suppress the flicker intensity IFL to be within the allowable range (within 3%), the intensity is 1% or more. Moreover, in the liquid crystal display device of Embodiment 1, when the absolute value of the flexoelectric coefficient of the liquid crystal layer 3 was set to 7 pC/m, the flicker intensity IFL increased to be greater than the allowable range. Therefore, an additional countermeasure is required in order to decrease the flicker intensity in the liquid crystal display device of Embodiment 1.

In Embodiment 2, an example of a method for suppressing occurrence of flickers even when the absolute value of the flexoelectric coefficient E of the liquid crystal layer 3 was increased will be described. Specifically, in this embodiment, for example, the relationship between the width L and spacing S of the fingers of the pixel electrode 17 shown in FIG. 9 is optimized so that the change over time in the transmittance TP is decreased to an extent that the change is not observed as flickers, namely the flicker intensity IFL falls within 1%.

Figure 13:
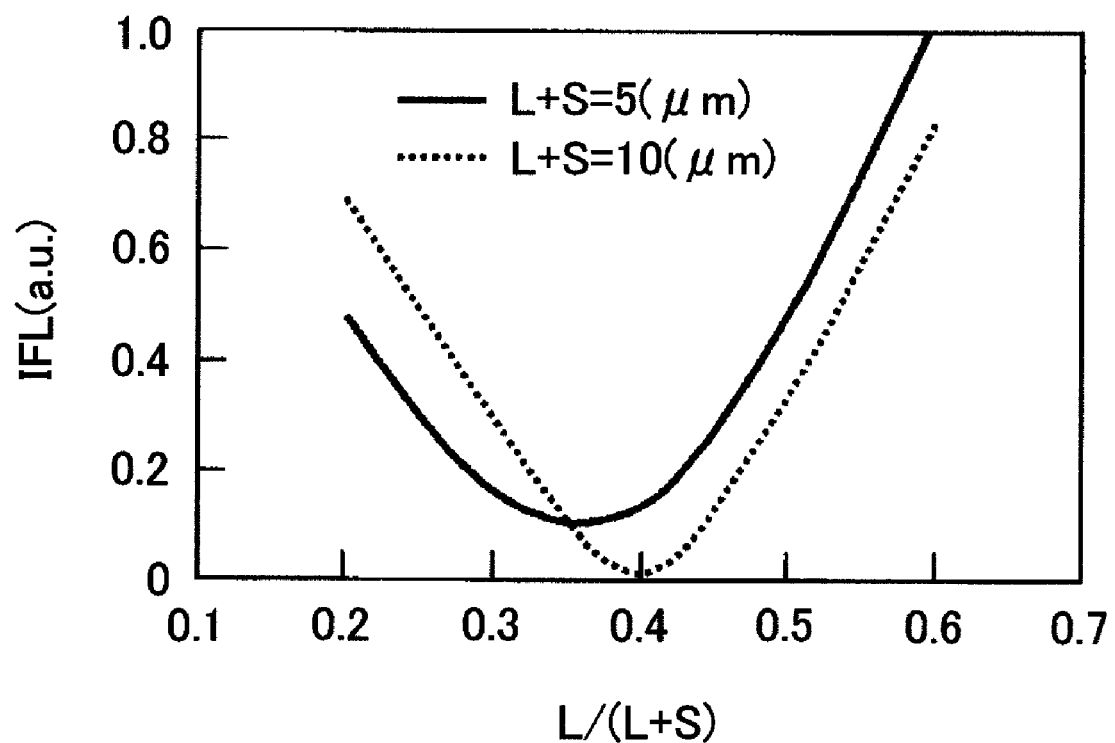
FIG. 13 is a graph showing an example of the relationship between the flicker intensity and the width L and spacing S of the fingers of a pixel electrode.

FIG. 13 is a graph showing an example of the relationship between the flicker intensity and the width L and spacing S of the fingers of a pixel electrode. In FIG. 13, the horizontal axis is L/(L+S), and the vertical axis is the flicker intensity IFL (in an arbitrary unit).

The inventors of this application investigated as to how much the flicker intensity IFL will change when the ratio of the width L and spacing S of the fingers of the pixel electrode 17 in the model shown in FIG. 9 was changed and obtained results as shown in FIG. 13, for example. FIG. 13 shows the results of simulation conducted under the conditions that the flexoelectric coefficient of the liquid crystal layer 3 was 10 pC/rn, and a ±5 volt AC voltage was applied. As the parameter representing the ratio of L and S, L/(L+S) was used. In addition, in FIG. 13, the solid line shows a change in the flicker intensity when the interdigital pitch (L+S) of the pixel electrode 17 was 5 µm, and the dotted line shows a change in the flicker intensity when the interdigital pitch was 10 µm.

As understood from FIG. 13, the flicker intensity IFL become minimal when the ratio L/(L+S) was about 0.35 for the interdigital pitch of 5 µm and the ratio L/(L+S) was about 0.40 for the interdigital pitch of 10 µm.

As discussed previously, when the flexoelectric polarization has an influence on the alignment of the liquid crystal layer 3, the transmittance TP changes in accordance with the polarity of the voltage applied to the liquid crystal layer 3. Therefore, the inventors of this application calculated the in-plane distribution of the transmittance in order to observe the change in the transmittance TP.

Figure 14A:
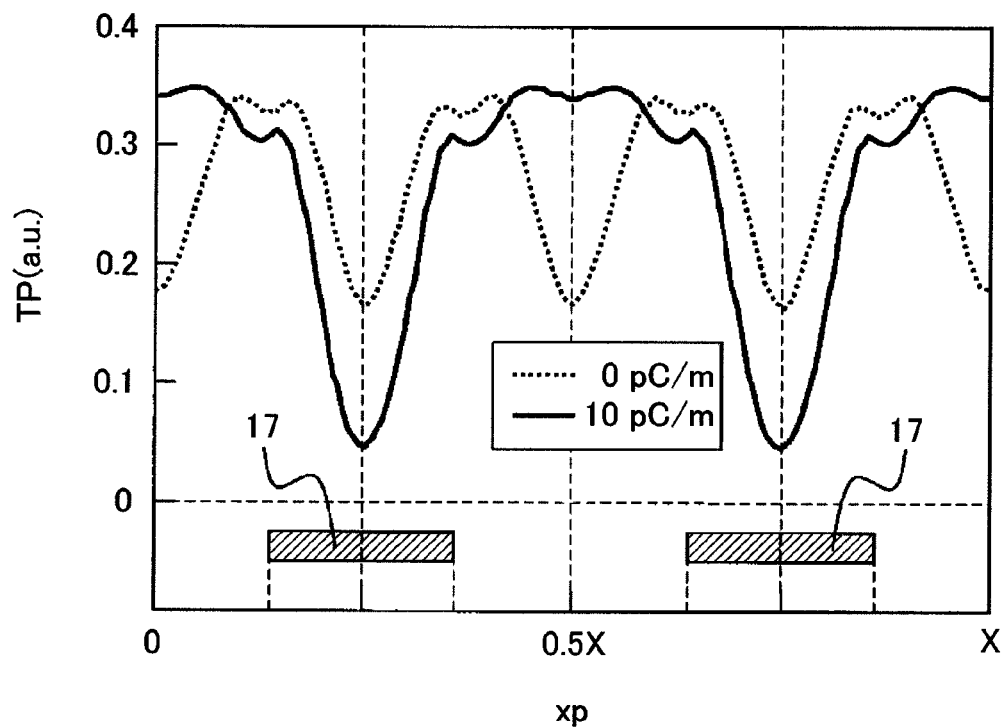
FIGS. 14A and 14B are graphs showing examples of the relationship between the flexoelectric coefficient of a liquid crystal layer and in-plane distribution of transmittance.
Figure 14B:
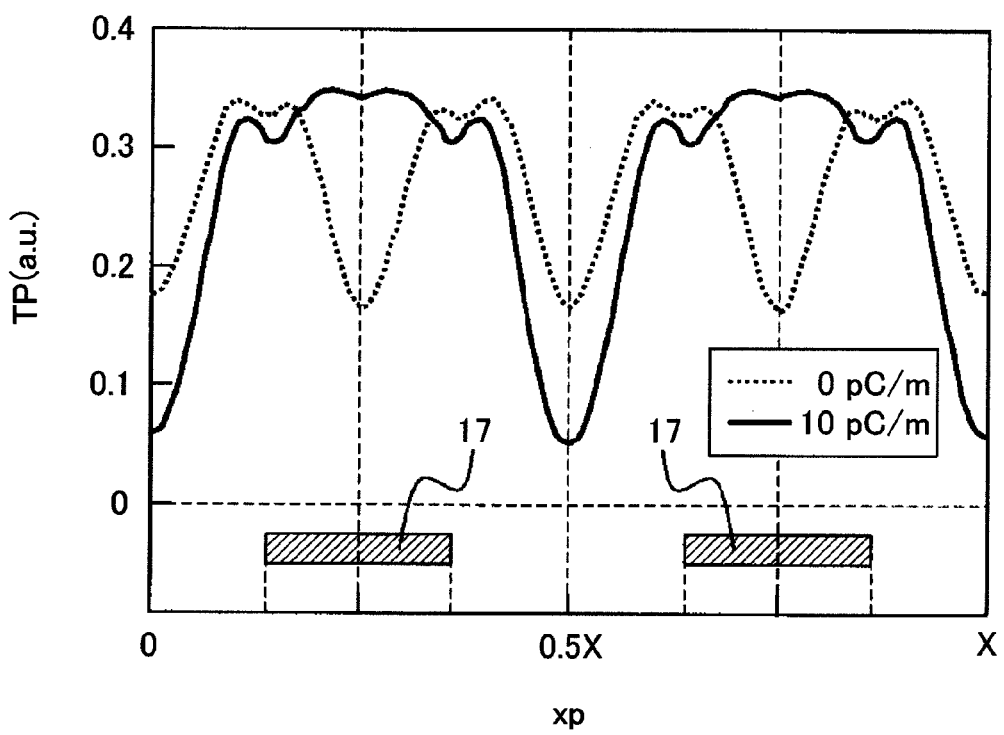

FIGS. 14A and 14B are graphs showing examples of the relationship between the flexoelectric coefficient of a liquid crystal layer and in-plane distribution of transmittance. In FIGS. 14A and 14B, the horizontal axis is the position in the x direction within the interval from xp=0 to xp=X shown in FIG. 9, and the vertical axis is the transmittance TP (in an arbitrary unit).

The inventors of this application calculated the in-plane distribution of the transmittance TP in the interval from xp=0 to xp=X shown in FIG. 9 using the simulator (LCD-Master) mentioned in Embodiment 1 and obtained results as shown in FIGS. 14A and 14B. FIG. 14A shows the in-plane distribution of the transmittance TP when a positive voltage (5 volts) was applied to the pixel electrode 17, and the solid line is the in-plane distribution when the flexoelectric coefficient was 10 pC/m. Moreover, FIG. 14B shows the in-plane distribution of the transmittance TP when a negative voltage (−5 volts) was applied to the pixel electrode 17, and the solid line is the in-plane distribution when the flexoelectric coefficient was 10 pC/m. Furthermore, the distribution in the dotted line shown in FIGS. 14A and 14B corresponds to the in-plane distribution of the transmittance TP when the flexoelectric coefficient was 0 pC/m.

As understood from FIGS. 14A and 14B, the in-plane distribution of the transmittance TP when the flexoelectric coefficient was 0 pC/m, namely when the flexoelectric effect was ignored, is substantially the same regardless of the polarity of the voltage applied to the pixel electrode 17.

On the contrary, when the flexoelectric coefficient was 10 pC/m, an in-plane change in the transmittance TP was observed in accordance with the polarity of the voltage applied to the pixel electrode 17. When a positive voltage was applied, as shown in FIG. 14A, the transmittance TP on the fingers of the pixel electrode 17 decreased and the transmittance TP on the finger spacing increased. Moreover, when a negative voltage was applied, as shown in FIG. 14B, the transmittance TP on the fingers of the pixel electrode 17 increased, and the transmittance TP on the finger spacing decreased.

It can be understood from the above results that the optimum L/(L+S) in the liquid crystal display device of Embodiment 2 has a value at which the transmittance on the fingers of the pixel electrode 17 is substantially equal to the transmittance on the finger spacing when the polarity of the voltage applied to the pixel electrode 17 was changed.

Figure 15:
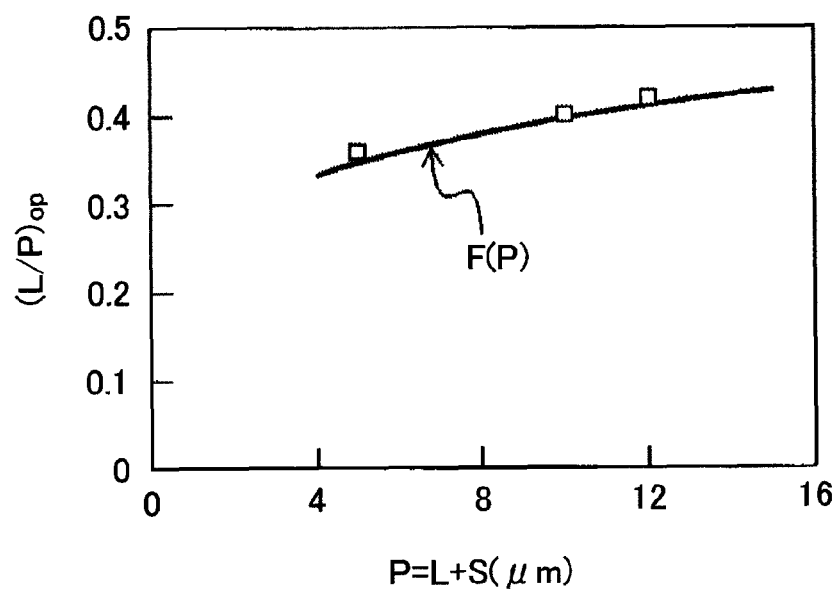
FIG. 15 is a graph showing an example of the relationship between an interdigital pitch and the optimum L/(L+S).

FIG. 15 is a graph showing an example of the relationship between an interdigital pitch and the optimum L/(L+S). In the graph of FIG. 15, the horizontal axis is the interdigital pitch P (=L+S) (in units of µm), and the vertical axis is the optimum value $(L/P)_{op}$ of L/(L+S).

The inventors of this application calculated the value L/P, namely the optimum value $(L/P)_{op}$ of L/(L+S), at which the flicker intensity IFL becomes minimum when the interdigital pitch was 5 µm, 10 µm, and 12 µm, and obtained results as shown in FIG. 15. In FIG. 15, rectangular points are the results calculated through simulation, and the curve F (P) is a regression curve obtained from the simulation results. In this case, the curve F(P) is given by Expression (3) below.

$$F(P) = 0.072 \times \log_e(P) + 0.234 \quad (3)$$

That is, by manufacturing the liquid crystal display panel of Embodiment 1 with pixels designed so that the relationship between the width L and pitch P (=L+S) of the fingers of the pixel electrode 17 satisfies Expression (3), it is possible to decrease the flicker intensity even when the flexoelectric coefficient E of the liquid crystal layer 3 has been increased.

The flicker intensity IFL in FIG. 13 is the result of calculation under the assumption that the fingers of the pixel electrode 17 continue infinitely. In actual liquid crystal display devices, the flicker intensity IFL in FIG. 13 is preferably equal to or smaller than 0.2, and is allowable if it is equal to or smaller than 0.3. Therefore, it can be said that L/(L+S) in that range is preferably within the range of ±0.05 from the approximate optimum value, and is allowable if it is within the range of ±0.10.

That is, in order to suppress occurrence of flickers in the liquid crystal display device of Embodiment 1, it is preferable to have a pixel configuration in which the relation of $0.05 \geq L/P - 0.072 \times \log_e(P) - 0.234 \geq -0.05$ is satisfied. In addition, the pixel configuration in which the flicker intensity is within the allowable range satisfies the relation of $0.10 \geq L/P - 0.072 \times \log_e(P) - 0.234 \geq -0.10$. That is to say, in the liquid crystal display device of Embodiment 2, by using the pixel configuration in which the relationship between the width L and spacing S of the fingers of the pixel electrode 17 satisfies such a condition, the driving voltage is decreased, and the flicker intensity is decreased.

As described above, according to the liquid crystal display device of Embodiment 2, it is possible to decrease the flicker intensity even when the absolute value of the flexoelectric coefficient E ($=e_{11}=e_{33}$) of the liquid crystal layer 3 of the IPS-Pro mode liquid crystal display panel is 5 pC/m or more. In addition, the liquid crystal display device of Embodiment 2 also provides an effect of improving the transmittance by suppressing flickers.

Furthermore, in Embodiment 2, similarly to Embodiment 1, the IPS-Pro mode liquid crystal display panel was described as an example of a liquid crystal display panel to which the present invention has been applied. The configuration of Embodiment 2 is not limited to the IPS-Pro mode, but can be applied to an AS-IPS mode liquid crystal display panel. In the case of the AS-IPS mode liquid crystal display panel, both the pixel electrode 17 and the common electrode 15 have an interdigital shape, and the fingers of the pixel electrode 17 and the fingers of the common electrode 15 are alternately arranged. Therefore, in the AS-IPS mode liquid crystal display panel, the number of lines of the electric field generated in the interdigital pitch is half that of the IPS-Pro mode liquid crystal display panel. Therefore, in the case of the AS-IPS mode liquid crystal display panel, Expression (3) can be rewritten as Expression (4) below.

$$F(P)=0.072 \times \log_e(2P)+0.234 \qquad (4)$$

In the interdigital pitch P (=L+S) in Expression (4), the spacing S is a spacing between the finger of the pixel electrode 17 and the finger of the common electrode 15. In addition, the width L may be either the finger width of the pixel electrode 17 or the finger width of the common electrode 15.

Moreover, in the case of the AS-IPS mode liquid crystal display panel, the same can be said for the allowable range of the flicker intensity as the IPS-Pro mode. Therefore, in the case of the AS-IPS mode, it is preferable to have a pixel configuration in which the relation of $0.05 \geq L/P - 0.072 \times \log_e(2P) - 0.234 \geq -0.05$ is satisfied. In addition, the pixel configuration in which the flicker intensity is within the allowable range satisfies the relation of $0.10 \geq L/P - 0.072 \times \log_e(2P) - 0.234 \geq -0.10$.

[Embodiment 3]

In Embodiment 3, another example of a method for suppressing occurrence of flickers even when the absolute value of the flexoelectric coefficient E of the liquid crystal layer 3 has been increased will be described. Specifically, in this embodiment, the driving frequency of the liquid crystal display panel is increased so that the change over time in the transmittance TP is suppressed, and the flicker intensity IFL is decreased to 3% or lower (preferably, 1% or lower).

In the case of a liquid crystal display panel where the flexoelectric polarization is generated, the response speed of the liquid crystal layer 3 is accelerated further as the flexoelectric polarization occurs more frequently. This is because the effect of the flexoelectric polarization is added to the response property of the liquid crystal layer 3 which was generally based on only the dielectric response. This phenomenon will be described with reference to FIG. 16.

Figure 16:
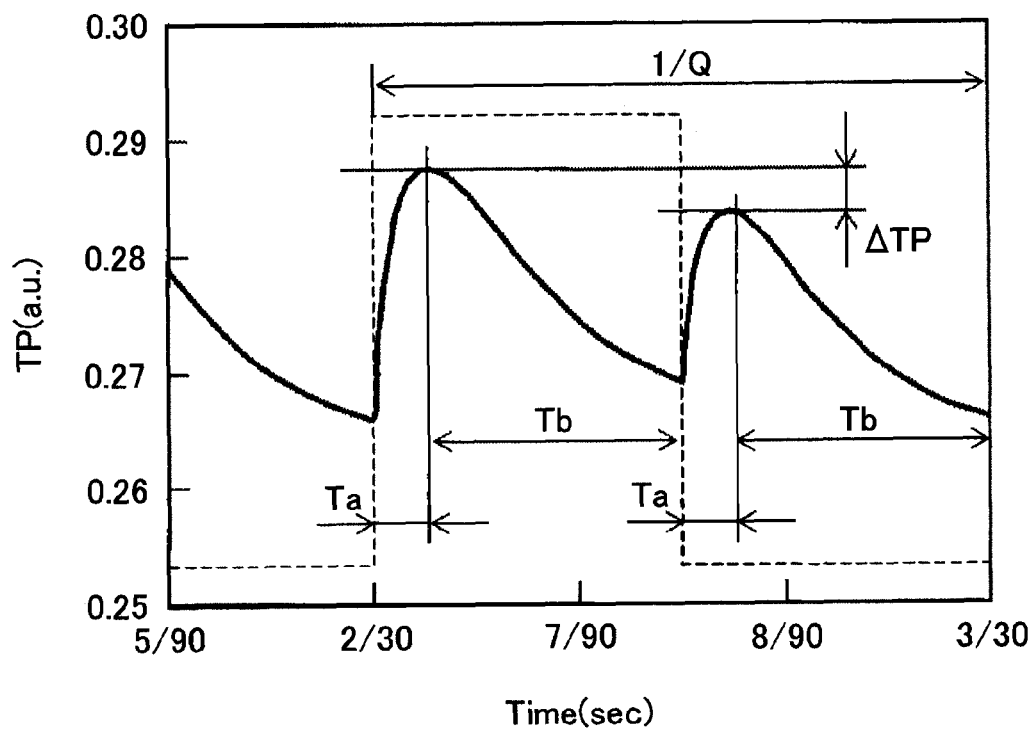
FIG. 16 is a graph showing an example of a change over time in transmittance when a liquid crystal display panel of Embodiment 1 has been driven.

FIG. 16 is a graph showing an example of a change over time in transmittance when a liquid crystal display panel of Embodiment 1 has been driven. FIG. 16 is also an enlarged view of a part of FIG. 11, in which the horizontal axis is the elapsed time (in units of seconds) from the driving start time, and the vertical axis is the transmittance TP (in an arbitrary unit).

When the liquid crystal display panel of Embodiment 1 was driven at a typical driving frequency (60 Hz), the change over time in the transmittance TP was plotted as shown in FIG. 16. That is, the transmittance TP rose abruptly to the maximum immediately after the polarity of the voltage was changed, and thereafter, the transmittance TP decreased gradually. In this case, the interval Ta where the transmittance TP rises immediately after the polarity of the voltage was changed is an interval where an optical response due to the flexoelectric polarization takes place, and the subsequent interval Tb where the transmittance TP decreases is an interval where a dielectric response and an optical response due to an elastic relaxation process take place together.

When a 30-Hz AC voltage is applied to the pixel electrode 17 of the liquid crystal display panel of Embodiment 1, since the range of fluctuation of the transmittance TP is large, the change in the transmittance TP is likely to be observed as flickers. That is, when the liquid crystal display panel of Embodiment 1 is driven at a driving frequency of 60 Hz while reversing the polarities (the magnitude relationship between the potential of the pixel electrode 17 and the potential of the common electrode 15) every frame period, flickers may be observed easily.

However, when an AC voltage is applied to the liquid crystal display panel of Embodiment 1, a difference ΔTP between the maximum transmittance during application of the positive voltage and the maximum transmittance during application of the negative voltage has an approximately constant value regardless of the frequency of the AC voltage. Therefore, when the interval Tb is decreased by increasing the frequency of the applied AC voltage, the range of fluctuation of the transmittance is decreased.

The interval Ta in the liquid crystal display panel of Embodiment 1 is about 3 milliseconds. Therefore, by setting the frequency of the AC voltage applied to the liquid crystal display panel to about 166.7 (=1/(3/1000×2)) Hz, the interval Tb becomes approximately 0, and the range of fluctuation of the transmittance TP can be minimized. As understood from FIG. 16, even when the interval Tb is not exactly 0, if the amount of change (decrease) in the transmittance in the interval Tb is smaller than the difference ΔTP, the range of fluctuation of the transmittance is minimized. Therefore, by setting the frequency of the AC voltage applied to the liquid crystal display panel to about 150 Hz, it is possible to minimize the range of fluctuation of the transmittance.

As described above, the flicker intensity of the liquid crystal display device is allowable if it is within 3%, and preferably, is within 1%. Therefore, when the range of fluctuation of the transmittance TP where the flicker intensity was within 1% was determined from FIG. 16, the frequency of the AC voltage was calculated to be about 100 Hz based on the determined range of fluctuation. Moreover, when the range of fluctuation of the transmittance where the flicker intensity was within 3% was determined from FIG. 16, the frequency of the AC voltage was calculated to be about 60 Hz based on the determined range of fluctuation. That is, when the flexoelectric coefficient E ($=e_{11}=e_{33}$) of the liquid crystal layer 3 in the liquid crystal display panel of Embodiment 1 was 10 pC/m, and the liquid crystal display panel was driven at a driving frequency of 120 Hz or higher, for example, while reversing the polarities every frame period, the flicker intensity was 3% or lower, and the flickers were rarely observed. Moreover, when the liquid crystal display panel was driven at a driving frequency of 200 Hz or higher while reversing the polarities every frame period, the flicker intensity was 1% or lower, and it was possible to suppress the flickers further.

Figure 17A:
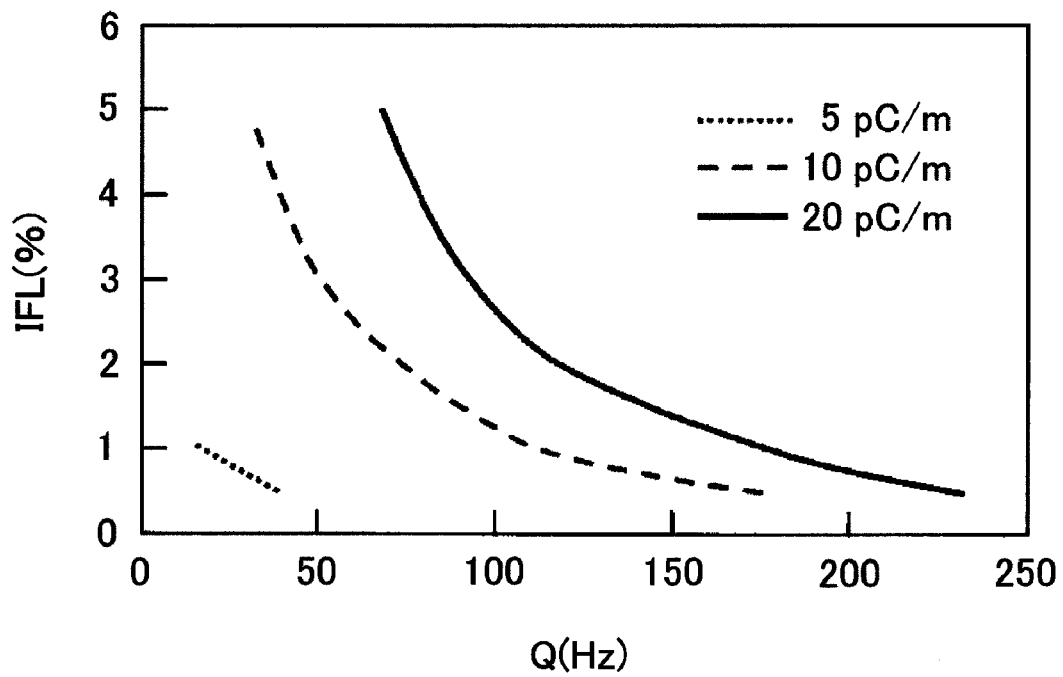
FIGS. 17A and 17B are graphs showing flexoelectric coefficient dependence of the relationship between the frequency of an AC voltage and the flicker intensity.
Figure 17B:
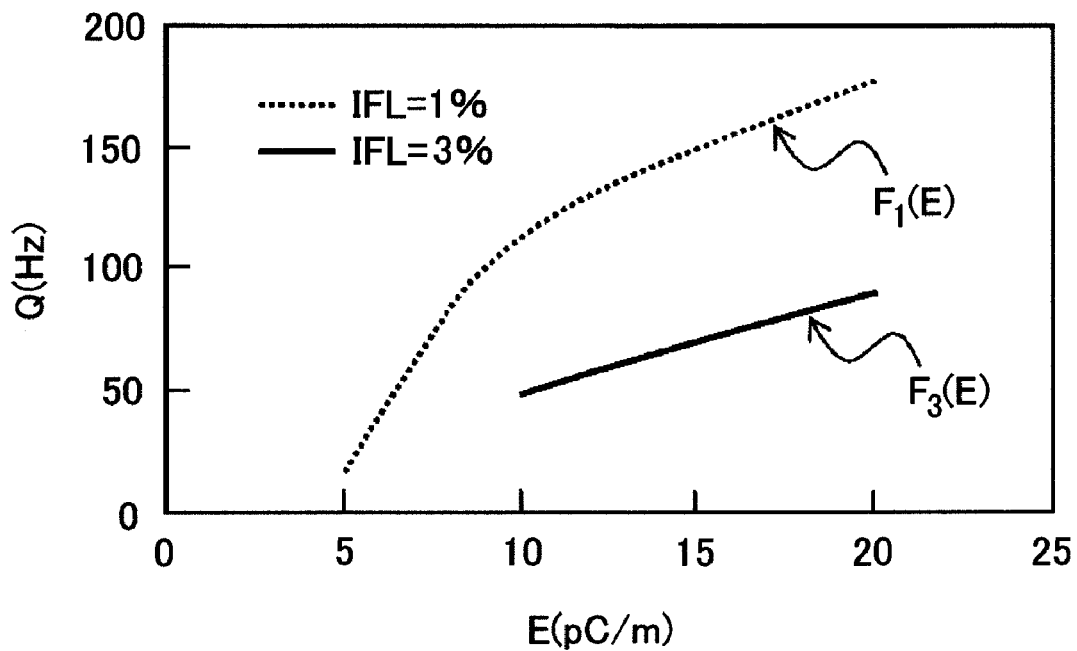

FIGS. 17A and 17B are graphs showing flexoelectric coefficient dependence of the relationship between the frequency of an AC voltage and the flicker intensity. In FIG. 17A, the horizontal axis is the frequency Q (in units of Hz) of the AC voltage, and the vertical axis is the flicker intensity IFL (in units of %). Moreover, in FIG. 17B, the horizontal axis is the flexoelectric coefficient E (in units of pC/m), and the vertical axis is the frequency Q (in units of Hz) of the AC voltage.

The inventors of this application investigated the relationship between the frequency Q of the AC voltage and the flicker intensity IFL while changing the value of the flexoelectric coefficient E of the liquid crystal layer 3 and obtained results as shown in FIG. 17A, for example. FIG. 17A shows the relationship between the frequency Q of the AC voltage and the flicker intensity IFL when the flexoelectric coefficient E was 5 pC/m, 10 pC/m, and 20 pC/m. In the curve of FIG. 17A, the frequency Q and the flicker intensity IFL are determined by a difference between the peaks of the response waveform shown in FIG. 16. For example, the frequency Q at which the flicker intensity is 1% is obtained by calculating the period during which luminance changes 1% from the peak (the maximum of the transmittance TP) and taking an inverse (1/Q) of the period.

As understood from FIG. 17A, as the flexoelectric coefficient E of the liquid crystal layer 3 increases, the frequency Q of the AC voltage at which the flicker intensity falls within the allowable range (within 3%) increases.

When the relationship between the frequency of the AC voltage and the flexoelectric coefficient at which the flicker intensity falls within 3% is calculated based on the above results, the relationship can be plotted as a curve $F_3(E)$ shown in FIG. 17B. Similarly, when the relationship between the frequency of the AC voltage and the flexoelectric coefficient at which the flicker intensity falls within 1% is calculated based on the above results, the relationship can be plotted as a curve $F_1(E)$ shown in FIG. 17B. In this case, the curves $F_1(E)$ and $F_3(E)$ are expressed by Expressions (5) and (6) below.

$$F_1(E) = 116.8 \times \log_e(E) - 165.7 \quad (5)$$

$$F_3(E) = 61.5 \times \log_e(E) - 91.5 \quad (6)$$

Therefore, in the liquid crystal display device having the liquid crystal display panel of Embodiment 1, it may be helpful to set the frequency Q of the AC voltage applied to the liquid crystal display panel so as to satisfy Expression (7) below in order to decrease the flicker intensity to be within 1%. In addition, it may be helpful to set the frequency Q of the AC voltage applied to the liquid crystal display panel so as to satisfy Expression (8) below in order to decrease the flicker intensity to be within 3%.

$$Q > 116.8 \times \log_e(E) - 165.7 \quad (7)$$

$$Q > 61.5 \times \log_e(E) - 91.5 \quad (8)$$

That is to say, the liquid crystal display device of Embodiment 3 decreases the flicker intensity by driving the liquid crystal display device that has the liquid crystal display panel with the configuration described in Embodiment 1 under the condition that Expression (7) or (8) is satisfied.

As described above, according to the liquid crystal display device of Embodiment 3, by setting the frequency of the AC voltage applied to the pixel electrode to be equal to or higher than 30 Hz, it is possible to suppress the flicker intensity to be within 3% or 1% even when the flexoelectric coefficient of the liquid crystal layer 3 is 7 pC/m or more and make flickers unobservable. In addition, by increasing the driving frequency of the liquid crystal display panel, it is possible to provide a liquid crystal display device that has excellent moving-picture performance.

Furthermore, the configuration (driving method) of Embodiment 3 is not limited to the IPS-Pro mode liquid crystal display panel but can be applied to an AS-IPS mode liquid crystal display panel.

As described above, according to the liquid crystal display device of the present invention which has been described in detail based on plural embodiments, it is possible to decrease the driving voltage while suppressing a decrease in luminance.

The present invention is not limited to the embodiments described above but can be modified in various ways within the range without departing from the spirit thereof.

For example, although Embodiments 1 to 3 have described a transmissive liquid crystal display panel by way of an example, the present invention is not limited to this but can be applied to semi-transmissive and reflective liquid crystal display panels.

What is claimed is:

1. A liquid crystal display device comprising:
   a first substrate;
   a second substrate;
   a liquid crystal layer interposed between the first substrate and the second substrate; and
   a pixel electrode and a common electrode arranged between the second substrate and the liquid crystal layer,
   wherein either one of the pixel electrode or the common electrode has an interdigital shape, and
   wherein absolute values of both flexoelectric coefficients $e_{11}$ and $e_{33}$ of the liquid crystal layer are equal to or greater than 5 pC/m.

2. The liquid crystal display device according to claim 1, wherein the absolute values of both flexoelectric coefficients $e_{11}$ and $e_{33}$ of the liquid crystal layer are equal to or greater than 7 pC/m.

3. The liquid crystal display device according to claim 1, wherein the absolute values of both flexoelectric coefficients $e_{11}$ and $e_{33}$ of the liquid crystal layer are equal to or greater than 5 pC/m and equal to or smaller than 7 pC/m.

4. The liquid crystal display device according to claim 1, wherein the pixel electrode and the common electrode are stacked onto each other with an insulating layer disposed therebetween, and the pixel electrode or the common electrode, whichever is disposed closer to the liquid crystal layer, has an interdigital shape, and
   wherein a width L and spacing S of fingers of the electrode disposed closer to the liquid crystal layer and a sum P of the width L and spacing S satisfy a relation of $0.10 \geq (L/P) - 0.072 \times \log_e(P) - 0.234 \geq -0.10$.

5. The liquid crystal display device according to claim 4, wherein the width L and spacing S of the electrode disposed closer to the liquid crystal layer and the sum P of the width L and spacing S satisfy a relation of $0.05 \geq (L/P) - 0.072 \times \log_e(P) - 0.234 \geq -0.05$.

6. A liquid crystal display device comprising:
   a first substrate;
   a second substrate;
   a liquid crystal layer interposed between the first substrate and the second substrate; and
   a pixel electrode and a common electrode arranged between the second substrate and the liquid crystal layer,
   wherein both the pixel electrode and the common electrode have an interdigital shape, and
   wherein absolute values of both flexoelectric coefficients $e_{11}$ and $e_{33}$ of the liquid crystal layer are equal to or greater than 5 pC/m.

7. The liquid crystal display device according to claim 6, wherein the absolute value of both flexoelectric coefficients $e_{11}$ and $e_{33}$ of the liquid crystal layer are equal to or greater than 7 pC/m.

8. The liquid crystal display device according to claim 6, wherein the absolute value of both flexoelectric coefficients $e_{11}$ and $e_{33}$ of the liquid crystal layer are equal to or greater than 5 pC/m and equal to or smaller than 7 pC/m.

9. The liquid crystal display device according to claim 6,
   wherein the pixel electrode and the common electrode are arranged on a same surface of an insulating layer, and fingers of the pixel electrode and fingers of the common electrode are alternately arranged in a line, and
   wherein a width L of the finger of the pixel electrode, a spacing S between the pixel electrode and the common electrode, and a sum P of the width L and spacing S satisfy a relation of $0.10 \geq (L/P) - 0.072 \times \log_e(2P) - 0.234 \geq -0.10$.

10. The liquid crystal display device according to claim 9, wherein the width L and spacing S of the pixel electrode and the common electrode and the sum P of the width L and spacing S satisfy a relation of $0.05 \geqq (L/P) - 0.072 \times \log_e(2P) - 0.234 \geqq -0.05$.

11. The liquid crystal display device according to claim 6, wherein the pixel electrode and the common electrode are arranged on a same surface of an insulating layer, and fingers of the pixel electrode and fingers of the common electrode are alternately arranged in a line, and wherein a width L of the finger of the common electrode, a spacing S between the pixel electrode and the common electrode, and a sum P of the width L and spacing S satisfy a relation of $0.10 \geqq (L/P) - 0.072 \times \log_e(2P) - 0.234 \geqq -0.10$.

12. The liquid crystal display device according to claim 11, wherein the width L and spacing S of the pixel electrode and the common electrode and the sum P of the width L and spacing S satisfy a relation of $0.05 \geqq (L/P) - 0.072 \times \log_e(2P) - 0.234 \geqq -0.05$.

13. The liquid crystal display device according to claim 1, wherein the flexoelectric coefficient E of the liquid crystal layer and a frequency Q of a voltage applied to the pixel electrode satisfy a relation of $Q > 61.5 \times \log_e(E) - 91.5$.

14. The liquid crystal display device according to claim 13, wherein the frequency Q of a voltage applied to the pixel electrode satisfies a relation of $Q > 116.8 \times \log_e(E) - 165.7$.

15. The liquid crystal display device according to claim 1, wherein a frequency of a voltage applied to the pixel electrode is equal to or higher than 60 Hz and lower than 150 Hz.

16. The liquid crystal display device according to claim 1, wherein the liquid crystal layer has positive dielectric anisotropy.

17. The liquid crystal display device according to claim 1, wherein the liquid crystal layer has negative dielectric anisotropy.

\* \* \* \* \*